United States Patent
Kano

(10) Patent No.: US 8,830,842 B2
(45) Date of Patent: Sep. 9, 2014

(54) COMMUNICATION APPARATUS AND COMMUNICATION METHOD

(75) Inventor: Shinya Kano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 551 days.

(21) Appl. No.: 13/176,227

(22) Filed: Jul. 5, 2011

(65) Prior Publication Data

US 2012/0008507 A1    Jan. 12, 2012

(30) Foreign Application Priority Data

Jul. 6, 2010  (JP) .................................. 2010-153930

(51) Int. Cl.
| | | |
|---|---|---|
| H04L 12/26 | (2006.01) | |
| H04L 12/703 | (2013.01) | |
| H04L 12/707 | (2013.01) | |
| H04L 12/46 | (2006.01) | |
| H04L 12/721 | (2013.01) | |
| H04L 12/24 | (2006.01) | |

(52) U.S. Cl.
CPC ............... *H04L 43/10* (2013.01); *H04L 45/28* (2013.01); *H04L 45/22* (2013.01); *H04L 12/4641* (2013.01); *H04L 45/66* (2013.01); *H04L 41/0677* (2013.01)
USPC .................................................... 370/241.1

(58) Field of Classification Search
USPC ................................. 370/229–253
See application file for complete search history.

(56) References Cited

U.S. PATENT DOCUMENTS

| | | | | |
|---|---|---|---|---|
| 6,324,161 | B1 * | 11/2001 | Kirch | 370/217 |
| 7,126,907 | B2 * | 10/2006 | Carpini et al. | 370/218 |
| 7,289,431 | B2 * | 10/2007 | Iijima | 370/218 |
| 7,502,314 | B2 * | 3/2009 | Shimizu | 370/227 |
| 7,801,049 | B2 * | 9/2010 | He | 370/241.1 |
| 8,411,688 | B2 * | 4/2013 | Farkas et al. | 370/395.53 |
| 2004/0019702 | A1 * | 1/2004 | Kojima et al. | 709/250 |
| 2009/0161563 | A1 | 6/2009 | Touma | |
| 2010/0208583 | A1 | 8/2010 | Liou et al. | |

FOREIGN PATENT DOCUMENTS

JP    2009-152729    7/2009

OTHER PUBLICATIONS

British Office Action for corresponding British Application No. GB1111486.5; dated Oct. 18, 2011.

(Continued)

*Primary Examiner* — Kwang B Yao
*Assistant Examiner* — Juvena Loo
(74) *Attorney, Agent, or Firm* — Staas & Halsey LLP

(57) ABSTRACT

A communication apparatus connected to an adjacent communication apparatus through a first path and a second path to receive a frame with a path identifier through the first path or the second path, the apparatus including: a first network interface configured for communicating via the first path; a second network interface configured for communicating via the second path; and a processor configured for extracting a first monitoring frame and a second monitoring frame, which are failure monitoring frames, from frames received on the first network interface and the second network interface; detecting a failure, based on input monitoring frames; and converting the path identifier of the first monitoring frame or the path identifier of the second monitoring frame, which are extracted, to make the path identifiers equal to each other.

17 Claims, 39 Drawing Sheets

(56) References Cited

OTHER PUBLICATIONS

ITU-T G.8031/Y1342, Series G: Transmission Systems and Media, Digital Systems and Networks. Ethernet over Transport aspects—General aspects. Series Y: Global Information Infrastructure, Internet Protocol Aspects and Next-Generation Networks. Internet protocol aspects—Transport. Ethernet Protection Switching. (Jun. 2006).

ITU-T Y. 1731, Series Y: Global Information Infrastructure, Internet Protocol Aspects and Next-Generation Networks. Internet protocol aspects—Operation, administration and maintenance. OAM functions and mechanisms for Ethernet based networks (Feb. 2008).

IEEE 802.1ag, IEEE Standard for Local and metropolitan area networks—Virtual Bridged Local Area Networks. Amendment 5: Connectivity Fault Management. IEEE Computer Society (Dec. 17, 2007).

* cited by examiner

FIG. 3A

| DESTINATION MAC | RECEIVING VLAN | TRANSMISSION PORT | TRANSMISSION VLAN |
|---|---|---|---|
| MACx | 2 | 30/40 | A/B |

| TRANSMISSION VLAN | FAILURE-MONITORING CARD NUMBER | WORKING VLAN RECEIVING VLAN ID |
|---|---|---|
| 2 | 1000 | 1 |

| WORKING/BACKUP STATE | TRANSMISSION PORT | TRANSMISSION VLAN ID |
|---|---|---|
| WORKING | 10 | 1 |
| BACKUP | 20 | 2 |

| RECEIVING VLAN | FAILURE-MONITORING CARD NUMBER | COMMON VLAN ID |
|---|---|---|
| 1 | 1000 | 100 |

| RECEIVING VLAN | FAILURE-MONITORING CARD NUMBER | COMMON VLAN ID |
|---|---|---|
| 2 | 1000 | 100 |

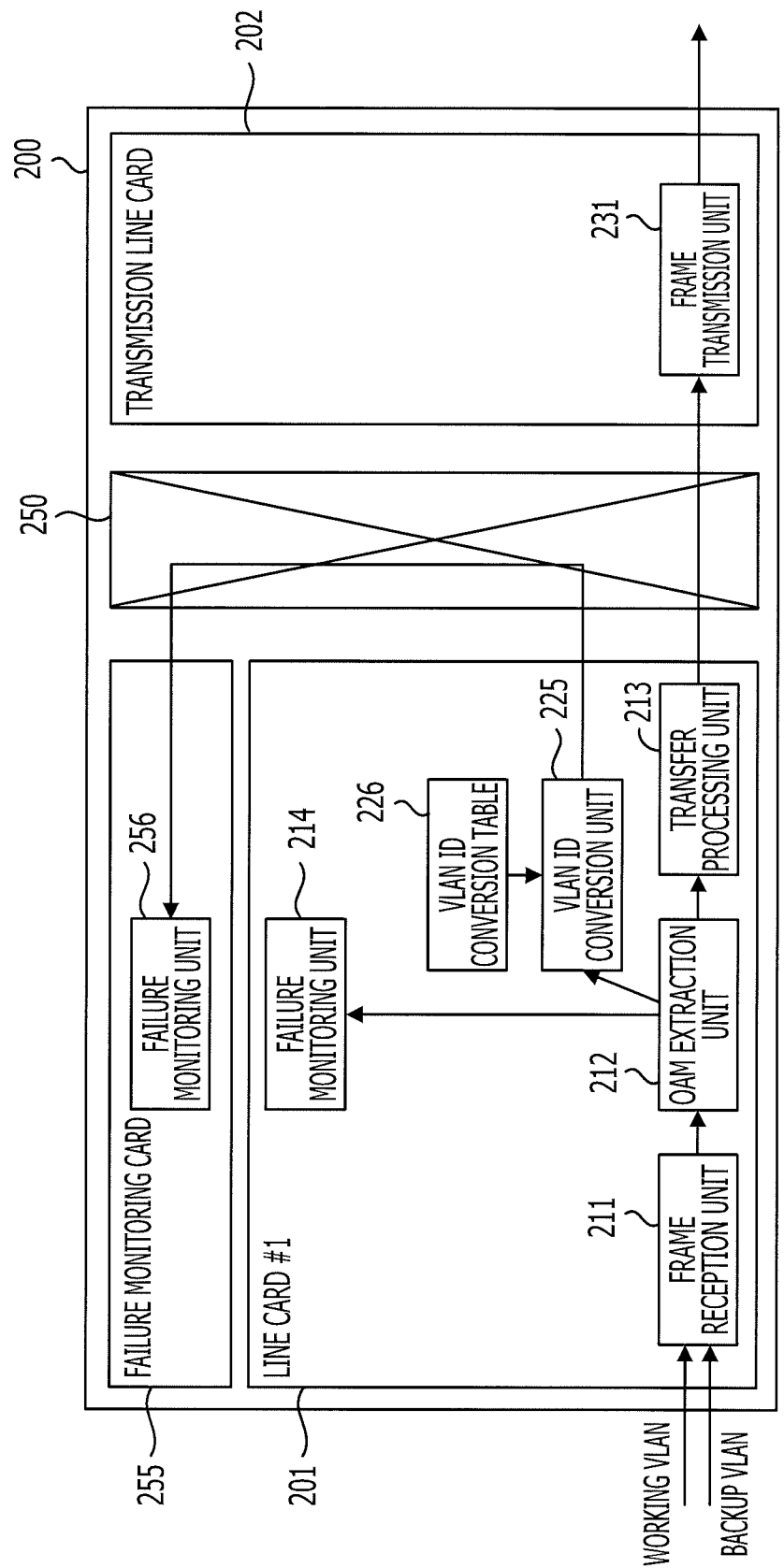

FIG. 14A

| RECEIVING VLAN | FAILURE-MONITORING CARD NUMBER | RECEIVED WORKING VLAN ID |
|---|---|---|
| 2 | 1000 | 1 |

| RECEIVING VLAN | FAILURE-MONITORING CARD NUMBER |
|---|---|
| 1 | 1000 |

2121

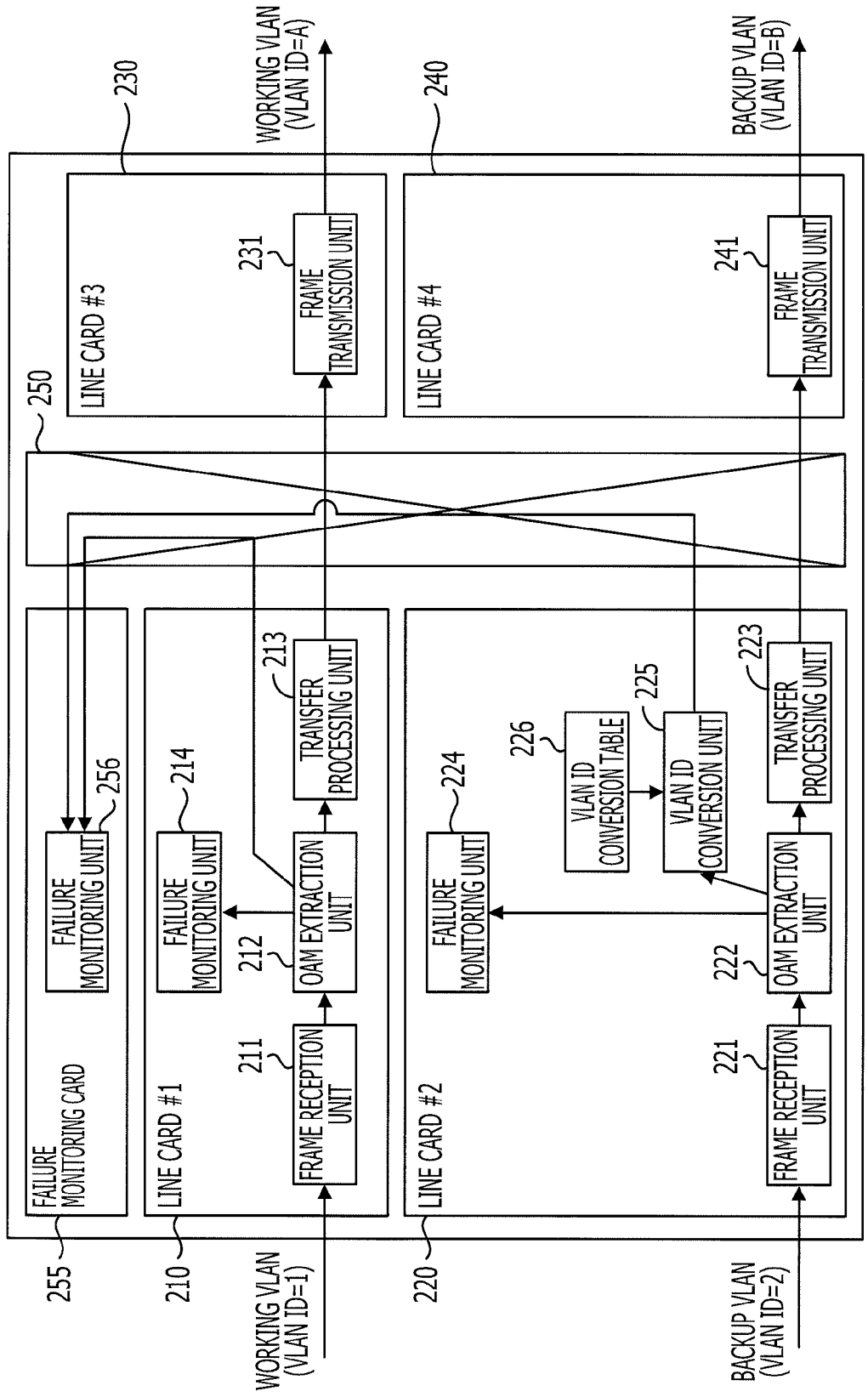

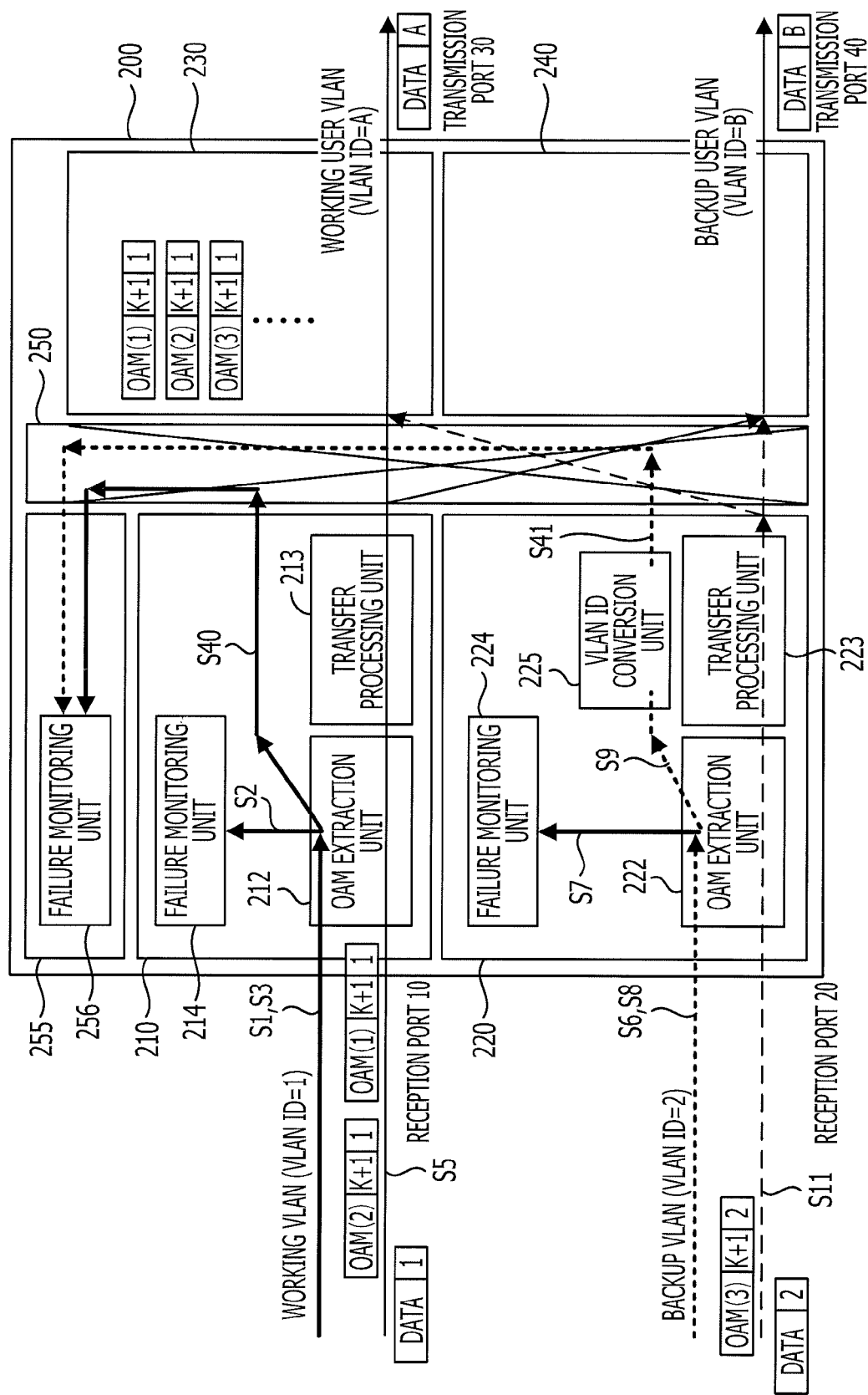

FIG. 18A

| RECEIVING VLAN | FAILURE-MONITORING CARD NUMBER |
|---|---|
| 1 | 1000 2000 |

| RECEIVING VLAN | FAILURE-MONITORING CARD NUMBER | RECEIVED WORKING VLAN ID |
|---|---|---|
| 2 | 1000 2000 | 1 |

226

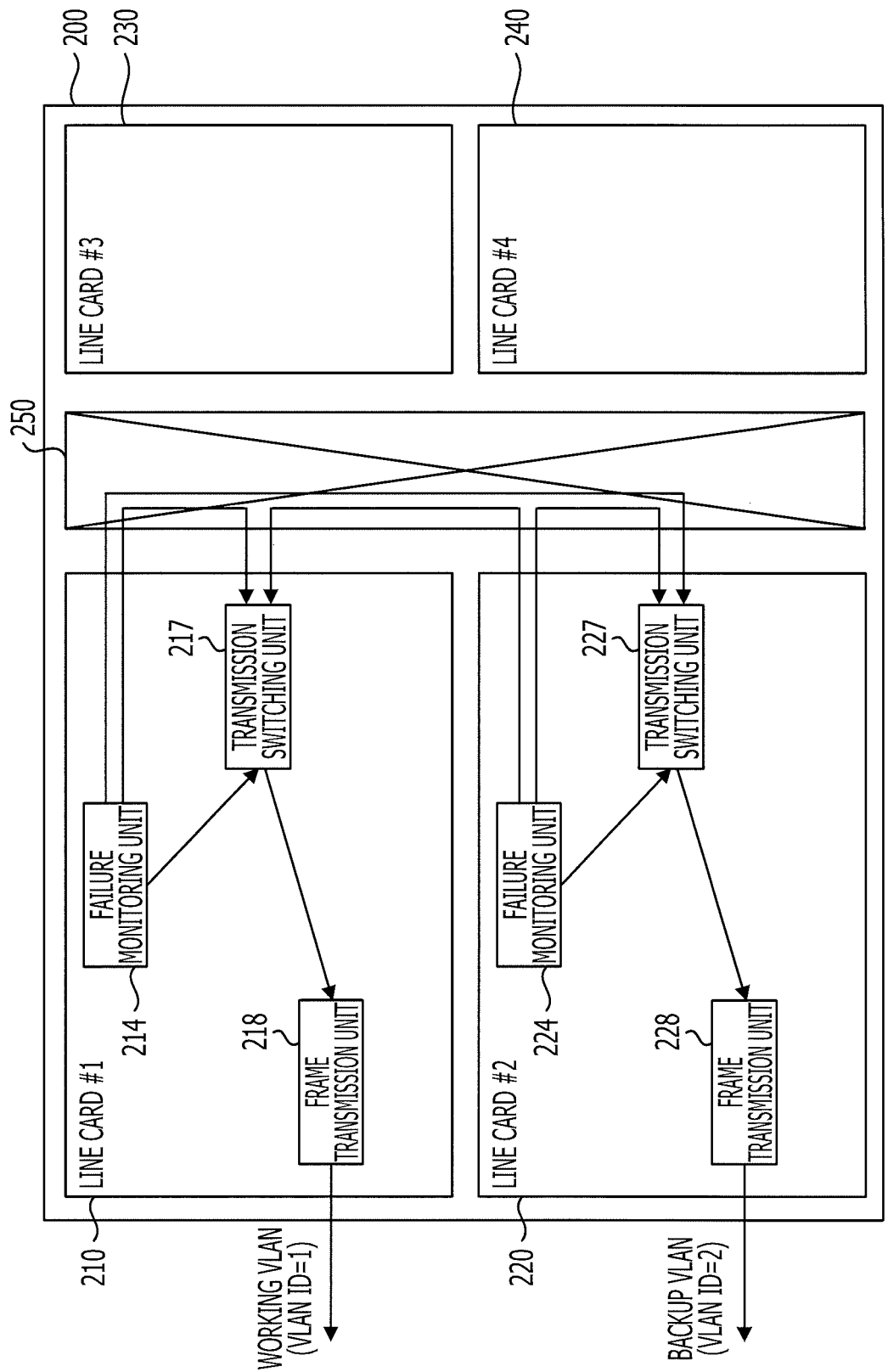

FIG. 25A

| RECEIVING VLAN | FAILURE-MONITORING CARD NUMBER | SERVICE IDENTIFIER |
|---|---|---|
| 1,2 | 1000 | 100 |

| RECEIVING VLAN | FAILURE-MONITORING CARD NUMBER | SERVICE IDENTIFIER |
|---|---|---|
| 1 | 1000 | 100 |

| RECEIVING VLAN | FAILURE-MONITORING CARD NUMBER | SERVICE IDENTIFIER |
|---|---|---|
| 2 | 1000 | 100 |

252(254)

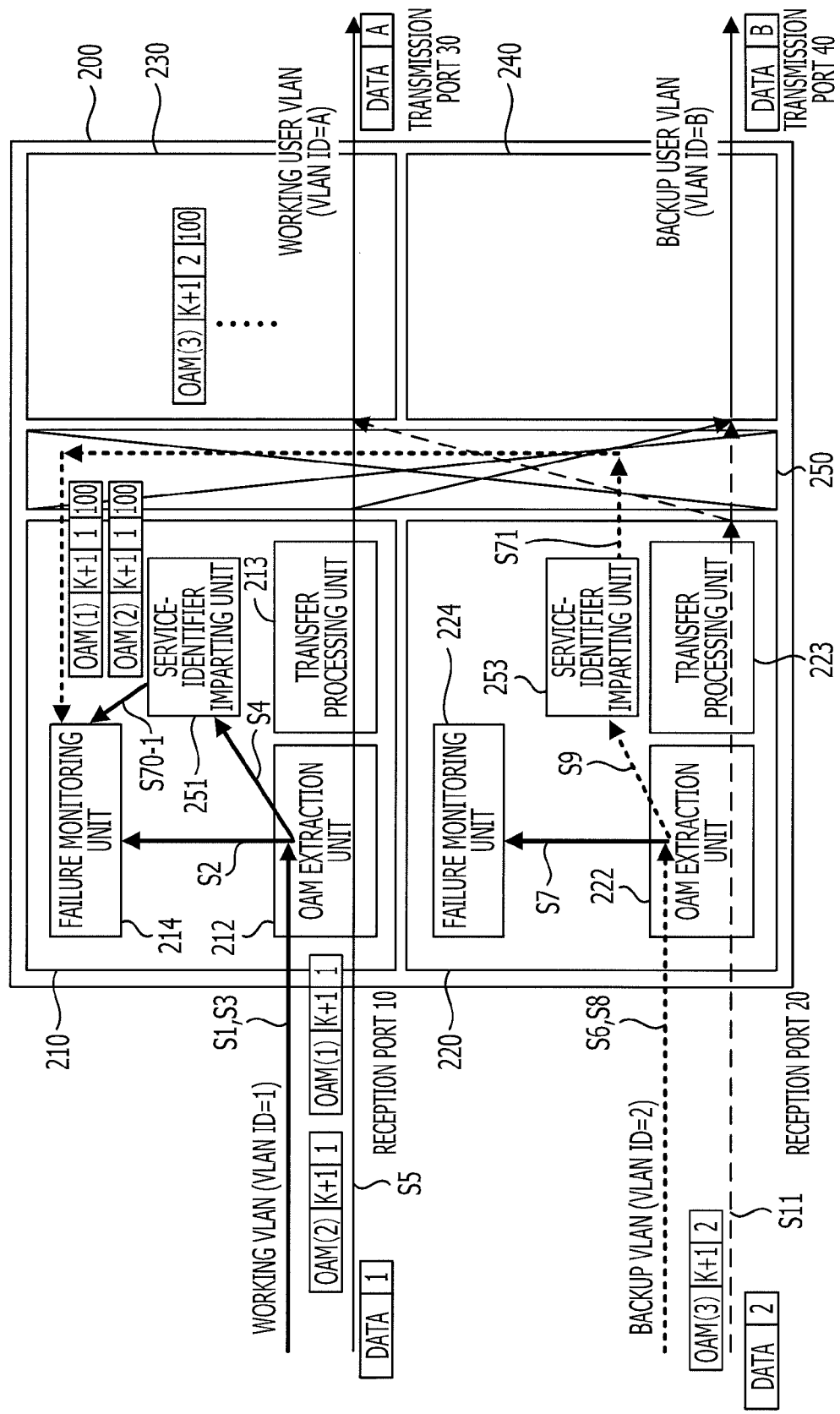

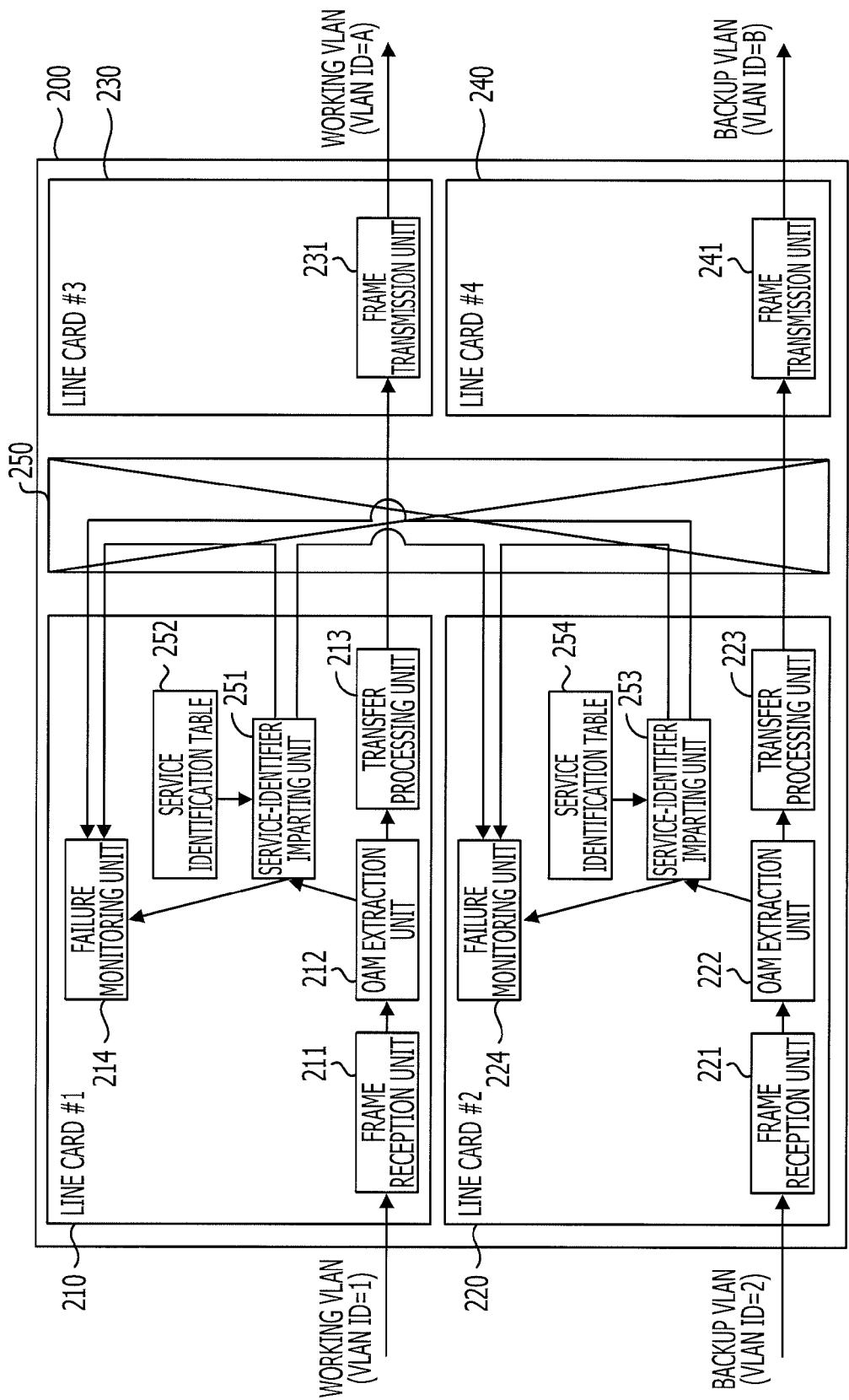

FIG. 30A

| RECEIVING VLAN | FAILURE-MONITORING CARD NUMBER | SERVICE IDENTIFIER |
|---|---|---|
| 1 | 1000 2000 | 100 |

| RECEIVING VLAN | FAILURE-MONITORING CARD NUMBER | SERVICE IDENTIFIER |
|---|---|---|
| 2 | 1000 2000 | 100 |

254

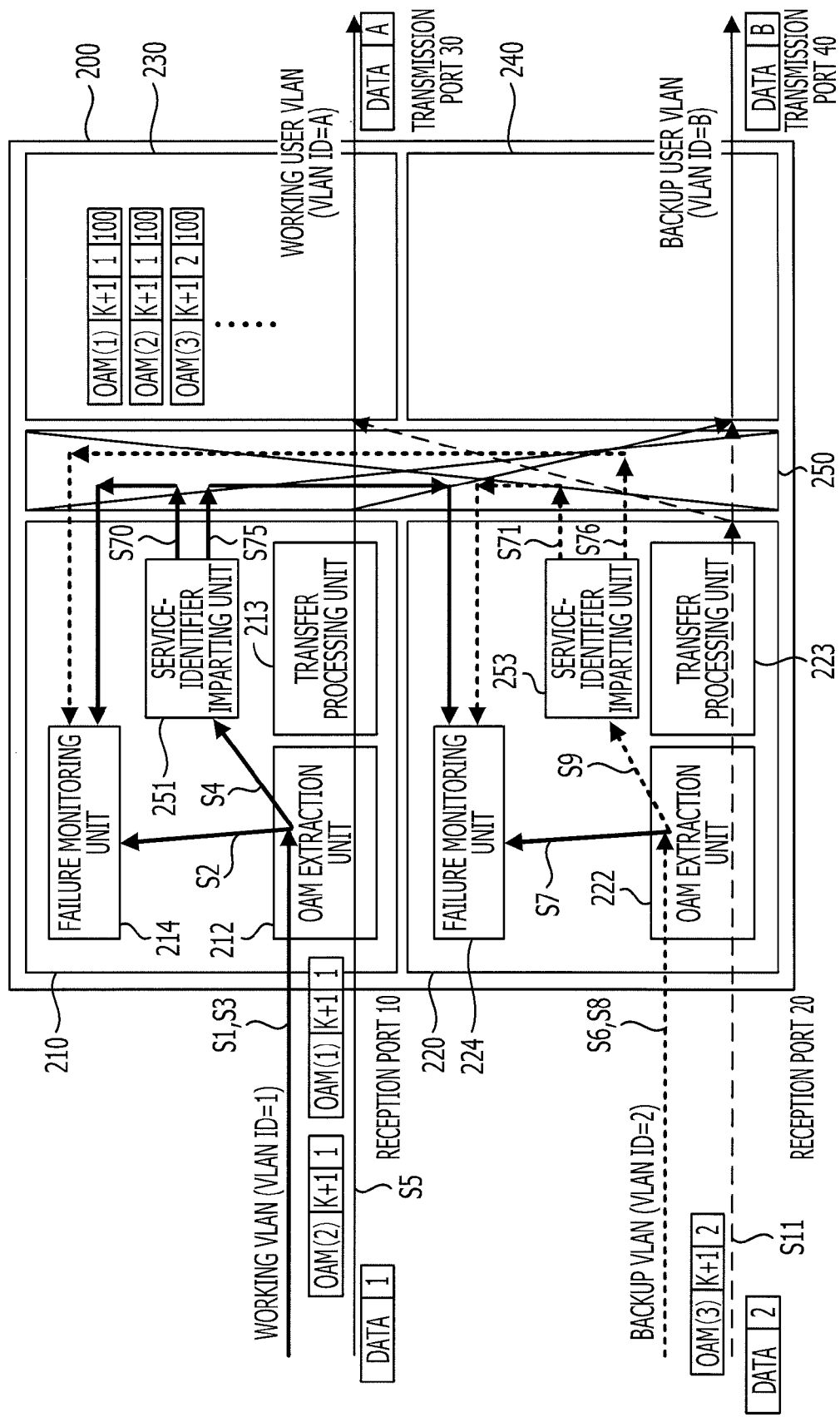

FIG. 37A

| USER DATA | ETHERNET (REGISTERED MARK) TYPE | VLAN ID | SOURCE MAC ADDRESS | DESTINATION MAC ADDRESS |
|---|---|---|---|---|

FIG. 37B

| OAM DATA | MONITORING LEVEL | ETHERNET (REGISTERED MARK) TYPE | VLAN ID | SOURCE MAC ADDRESS | DESTINATION MAC ADDRESS |
|---|---|---|---|---|---|

US 8,830,842 B2

COMMUNICATION APPARATUS AND COMMUNICATION METHOD

CROSS-REFERENCE TO RELATED APPLICATIONS

This application is based upon and claims the benefit of priority from the prior Japanese Patent Application No. 2010-153930 filed on Jul. 6, 2010, the entire contents of which are incorporated herein by reference.

BACKGROUND

1. Field

The present invention relates to a communication apparatus and a communication method.

2. Description of the Related Art

Heretofore, 1:1 protection has been known as one of the protection functions in networks such as Ethernet (registered trademark). The 1:1 protection is defined as different paths for a network in use and a network in reserve. When trouble occurs in the network in use, the network in reserve is used for transmitting frames and so on. FIG. 38 is a diagram illustrating an exemplary configuration of a communication system 1 which is set to 1:1 protection among the respective communication apparatuses 10 to 30. FIG. 36 illustrates a virtual local area network (VLAN) as an exemplary path.

When the path is configured, for instance, communication apparatuses 10 to 30 may exchange "Operations, Administration, and Maintenance" (OAM) frames, which are also referred to as "Continuity Check Messages" (CCMs), among one another to monitor the VLAN. For example, an exchange of OAM frames between the communication apparatus 10 and the communication apparatus 20 allows the communication apparatus 10 and 20 to monitor the working VLAN and the backup VLAN between the communication apparatuses 10 and 20. Hereinafter, this kind of the monitoring will be referred to as "individual VLAN monitoring". Likewise, the exchange of OAM frames allows the communication apparatuses 10 and 20 to monitor two VLANs, the working VLAN and the backup VLAN, between the communication apparatuses 10 and 20. Hereinafter, this kind of monitoring will be referred to as "service monitoring".

The OAM frame distinguishes between the individual VLAN monitoring and the service monitoring by monitoring levels. In the example illustrated in FIG. 36, the monitoring level of the individual VLAN monitoring is "K" and that of the service monitoring is "K+1". The service monitoring observes a wider (or longer) section compared with the individual VLAN. Thus, the service monitoring is provided with a higher level than that of the individual VLAN.

FIG. 37A and FIG. 37B are diagrams illustrating exemplary formats of the respective frames, a data frame in FIG. 37A and an OAM frame in FIG. 37B. As illustrated in FIG. 37B, the OAM frame includes a "monitor level". For example, the monitor level "K" or "K+1" may be inserted in the OAM frame. The "monitoring levels" included in the OAM frames allow the communication apparatuses 10 to 30 to determine the respective monitoring levels of the OAM frames.

The process for receiving the OAM frame or the like in each of the communication apparatuses 10 to 30 will be described. FIG. 38 is a diagram illustrating en exemplary reception processing in the communication apparatus 20. The communication apparatus 20 is connected to the opposite communication apparatus 10 through two paths, the working VLAN and the backup VLAN. Here, a line card #1 (260) is employed for the connection with the working VLAN and a line card #2 (270) is employed for the connection with the backup VLAN. In addition, the communication apparatus 20 is also connected to the communication apparatus 30 through the working VLAN and the backup VLAN. In this case, a line card #3 (280) is employed for the connection with the VLAN in use and a line card #4 (290) is employed for the connection with the backup VLAN.

The line card #1 (260) receives frames from the communication apparatus 10 through the working VLAN. An OAM extractor 262 of the line card #1 (260) outputs OAM frames of the monitoring level "K" among the received frames and the remainder is output to a transfer processor 263. A failure monitor 261 may verify the continuity of the OAM frames of the monitoring level "K" to monitor the working VLAN, which is connected to the communication apparatus 10. The communication apparatus 20 receives frames transmitted from the communication apparatus 10 through the backup VLAN. An OAM extractor 272 of the line card #2 (270) outputs OAM frames of the monitoring level "k" to a failure monitor 271 and outputs other OAM frames to a transfer processor 273. The failure monitor 271 may verify the continuity of the above OAM frames to monitor the backup VLAN.

When the working VLAN is in a normal state, the OAM frame of the monitoring level "K+1" received through the working VLAN is output from the transfer processor 263 to the line card #3 (280). When a failure or the like has occurred on the working VLAN, the pass is switched to the backup VLAN. An OAM frame of the monitoring level "K+1" received through the backup VLAN is output from the transfer processor 273 to the line card #3 (280).

The OAM extractor 282 of the line card #3 (280) outputs OAM frames of the monitoring level "K+1" to a failure monitor 281 and outputs other OAM frames to the working VLAN. The failure monitor 281 may monitor both the working VLAN and the backup VLAN (service monitoring). This is because the failure monitor 281 has an ability of receiving service-monitoring OAM frames (e.g., those of the monitoring level "K+1") even in either the case of the working VLAN in active state or the case of the backup VLAN in the active state.

On the other hand, when a failure or the like occurs in the working VLAN between the communication apparatus 20 and the communication apparatus 30, the path to the communication apparatus 30 is changed from the working VLAN to the backup VLAN. FIG. 39 is a diagram illustrating an exemplary process for receiving an OAM frame. The transfer processor 263 of the line card #1 (260) changes the destination of a frame from the line card #3 (280) to the line card #4 (290) upon detecting a failure in the working VLAN (e.g., one with VLAN ID=A) between the communication apparatuses 20 and 30. Therefore, the frame is transmitted to the communication apparatus 300 through the backup VLAN (e.g., one with VLAN ID=B).

Furthermore, 1+1 protection is also known as a protection function in a network. The 1+1 protection is a protection function that allows frames to be transmitted to both the working path and the backup path.

As a technology for the 1+1 protection, for example, a working monitoring frame and a backup monitoring frame are transmitted from a switch device on a transmitting side to both the working path and the backup path. Then, a switch device on a receiving side discards the backup-monitoring frame from the working path, while discarding the working-monitoring frame from the backup path. The transmitted working-monitoring frame and the transmitted backup monitoring frame are used for confirming communication through the respective paths.

Japanese Unexamined Patent Application Publication No. 2009-152729, ITU-T G.8031, IEEE 802.1ag, and ITU-T Y.1731 are examples of the related art.

SUMMARY

According to an aspect of the invention, a communication apparatus is connected to an adjacent communication apparatus through a first path and a second path to receive a frame with a path identifier through the first path or the second path, the apparatus including: a first network interface configured for communicating via the first path; a second network interface configured for communicating via the second path; and a processor configured for extracting a first monitoring frame and a second monitoring frame, which are failure monitoring frames, from frames received on the first network interface and the second network interface; detecting a failure, based on input monitoring frames; and converting the path identifier of the first monitoring frame or the path identifier of the second monitoring frame, which are extracted, to make the path identifiers equal to each other.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

BRIEF DESCRIPTION OF THE DRAWINGS

FIG. 3A is a diagram illustrating an exemplary MAC transfer table, FIG. 3B is a diagram illustrating an exemplary VLAN ID conversion table, and FIG. 3C is a diagram illustrating an exemplary OAM transmission-control table;

FIG. 11A and FIG. 11B are diagrams illustrating exemplary VLAN ID conversion tables;

FIG. 13 is a diagram illustrating an exemplary configuration of a receiving system of a communication apparatus;

FIG. 14A is a diagram illustrating an exemplary VLAN ID conversion table and FIG. 14B is a diagram illustrating an exemplary failure-monitor position table.

FIG. 15 is a diagram illustrating an exemplary configuration of a receiving system of a communication apparatus;

FIG. 16 is a diagram illustrating an exemplary operation of a communication apparatus;

FIG. 18A is an exemplary failure-monitor position table and FIG. 18B is an exemplary VLAN ID conversion table;

FIG. 19 is a diagram illustrating an exemplary configuration of a transmission system of the communication apparatus;

FIG. 25A to FIG. 25C are diagrams illustrating exemplary service identification tables;

FIG. 28 is a diagram illustrating an exemplary operation of a communication apparatus;

FIG. 29 is a diagram illustrating an exemplary configuration of a receiving system of a communication apparatus;

FIG. 30A and FIG. 30B are diagrams illustrating exemplary service identification tables;

FIG. 31 is a diagram illustrating an exemplary operation of a communication apparatus;

FIG. 37A is diagram illustrating an exemplary format of a data frame, and FIG. 37B is a diagram illustrating an exemplary format of an OAM frame;

DETAILED DESCRIPTION OF THE PREFERRED EMBODIMENTS

Figure 1:
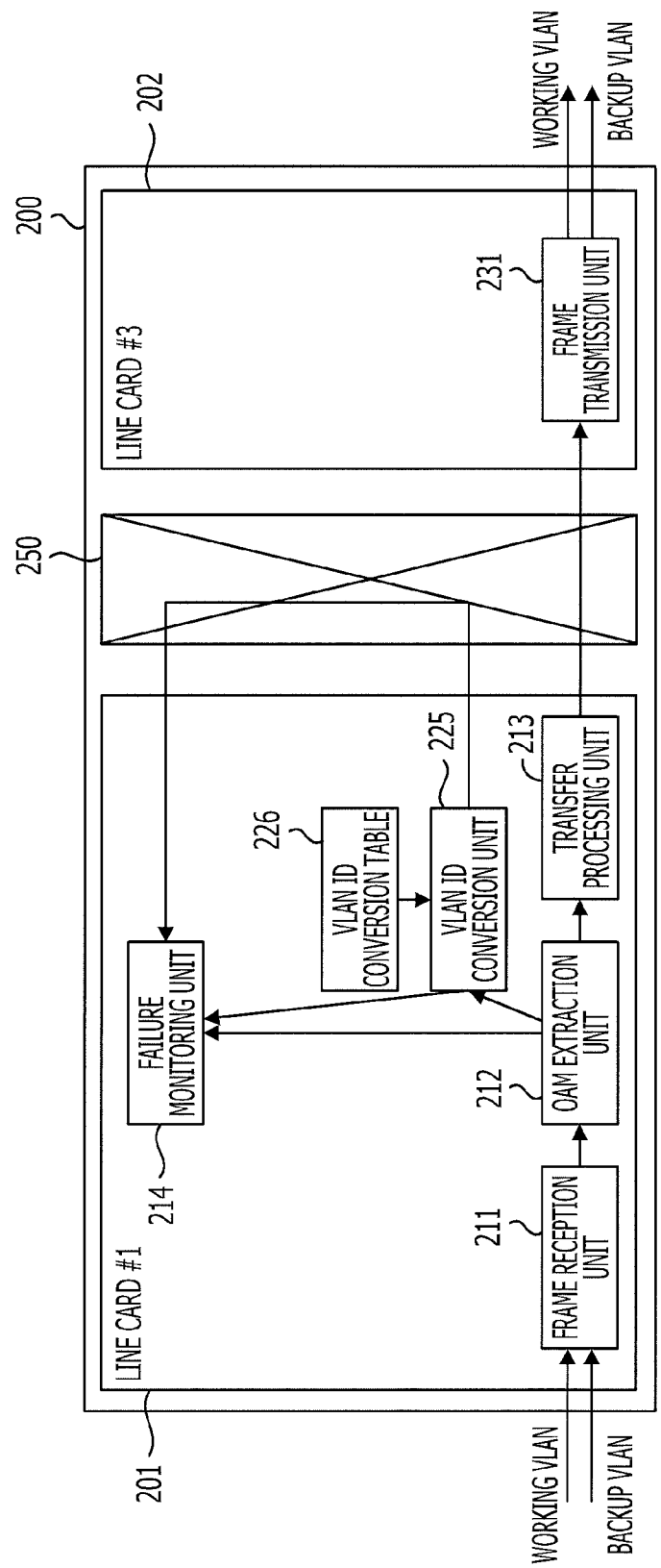
FIG. 1 is a diagram illustrating an exemplary configuration of a receiving system of a communication apparatus.

Reference may now be made in detail to embodiments of the present invention, examples of which are illustrated in the accompanying drawings, wherein like reference numerals refer to like elements throughout.

In the aforementioned technology, the communication apparatus 20 includes the failure monitor 281 in the line card #3 (280). However, no failure monitor is installed in the other line card #4 (290). When a failure or the like has occurred on the working VLAN between the communication apparatuses 20 and 30, the communication apparatus 20 performs transmission of a received frame after replacing the line card #3 (280) with the line card #4 (290). This replacement prevents a frame received by the communication apparatus 20 from being input into the line card #3 (280).

Since the failure monitor 281 of the line card #3 (280) is prevented from receiving the frame, the failure monitor 281 does not perform service monitoring. In this case, the failure monitor 281 may detect incorrect information, such as information indicating that two paths are blocked or a failure is generated, even though two paths between the communication apparatus 10 and the communication apparatus 20 are present.

To overcome this disadvantage, for example, the line card #4 (290) may be provided with a failure monitor. In this case, consideration is given to mutual cooperation between two failure monitors, one for the line card #3 (280) and the other for the line card #4 (290). In other words, two failure monitors check the sequence numbers of frames to verify the continuity of the frames. It is determined whether OAM frames storing the sequence numbers are received through a working VLAN or a backup VLAN, in accordance with the state of the network. These two failure monitors mutually exchange information of sequence numbers or the like to verify the continuity of the frames even after the switching of paths. In this case, for example, when the interval between OAM frames is much shorter than a threshold value, two failure monitors may attempt to mutually exchange the information at a rate higher than the threshold value. Thus, the failure monitors have difficulty cooperating with each other.

According to a first aspect, a communication apparatus connected to an adjacent communication apparatus through a first path and a second path to receive a frame with a path identifier through the first path or the second path, includes: a monitoring-frame extractor for extracting a first monitoring frame and a second monitoring frame, which are failure monitoring frames, from frames received from the first path and the second path; a failure monitor for detecting a failure, based on input monitoring frames; and a converter for converting the path identifier of the first monitoring frame or the path identifier of the second monitoring frame, which are extracted by the monitoring-frame extractor, to make the path identifiers equal to each other.

According to another aspect, a communication apparatus connected to an adjacent apparatus through a first path and a second path to receive a frame with a path identifier through the first path or the second path, includes: a monitoring-frame extractor for extracting a first monitoring frame and a second monitoring frame, which are failure monitoring frames, from frames received from the first path and the second path; a failure monitor for monitoring a failure, based on input monitoring frames; and a service-identifier imparting unit for imparting a service identifier to each of the first monitoring frame and the second monitoring frame, which are extracted by the monitoring-frame extractor and inputting the frames to the failure monitor.

Figure 33:
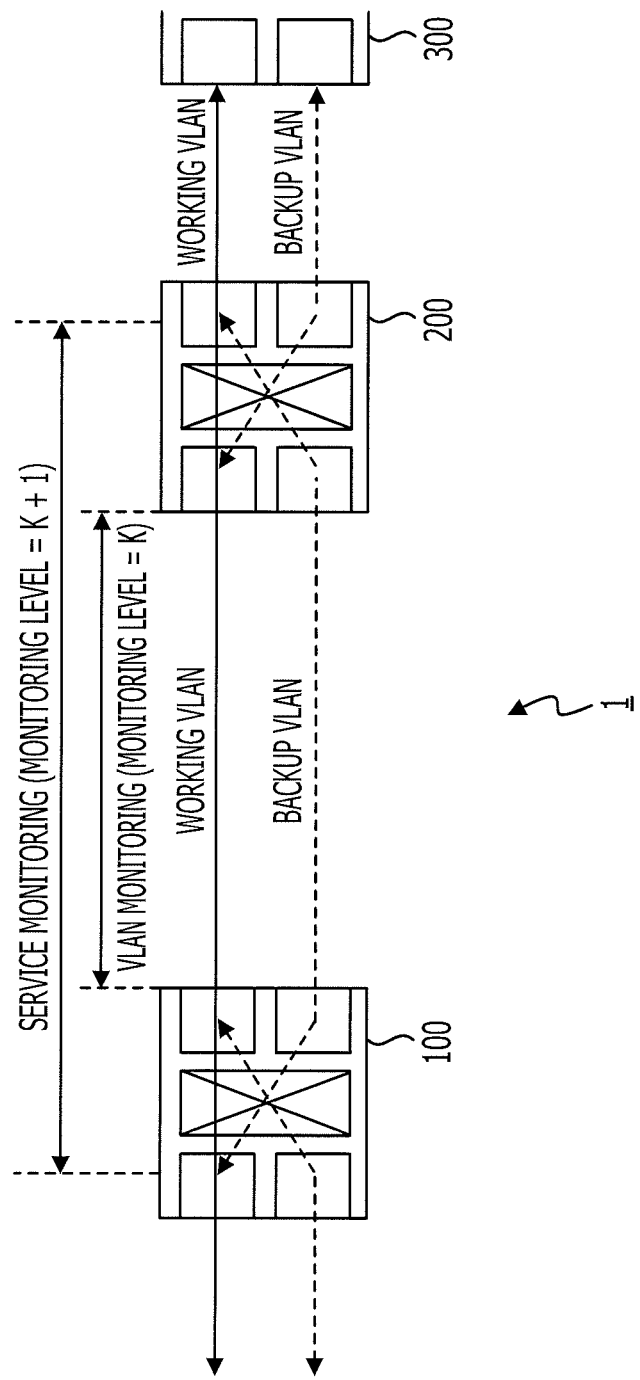
FIG. 33 is a diagram illustrating an exemplary configuration of a communication system.

Hereafter, embodiments of the present invention will be described. Each of these embodiments is configured such that the failure of the network is detected by 1:1 protection and each communication apparatus is connected to another communication apparatus through two paths, a working path and a backup path. FIG. 33 is a diagram illustrating an exemplary configuration of a communication system 1 according to any of the embodiments. The communication system 1 includes a plurality of communication apparatuses 100 to 300, where a communication apparatus 200 and a communication apparatus 100 are connected to each other through a working VLAN and a backup VLAN. When a failure has occurred on the working VLAN between the communication apparatus 100 and the communication apparatus 200, the path is switched from the working path to the backup path to transmit and receive frames through the backup VLAN. The same is also applied to the communication apparatus 200 and the communication apparatus 300.

In each of the embodiments, for example, the term "individual VLAN monitoring" means that VLANs, the working VLAN and the backup VLAN, are individually monitored; and the term "service monitoring (or "monitoring of service")" means that both the working VLAN and the restored VLAN are monitored.

<First Embodiment>

First, a first embodiment will be described. In the first embodiment, for example, service monitoring may be performed using a VLAN ID. The VLAN ID is an identification code for identifying, for example, two VLANs (or paths), a working VLAN and a backup VLAN. An example illustrated in FIG. 33, the working and backup VLANs between the communication apparatuses 100 and 200 have VLAN IDs "1" and "2", respectively, and the working and backup VLANs between the communication apparatuses 200 and 300 have VLAN IDs "A" and "B", respectively. The VLAN IDs may be inserted into the respective frames, such as OAM frames and data frames, before transmission of these frames.

<Exemplary Configuration of Receiving System>

Figure 2:
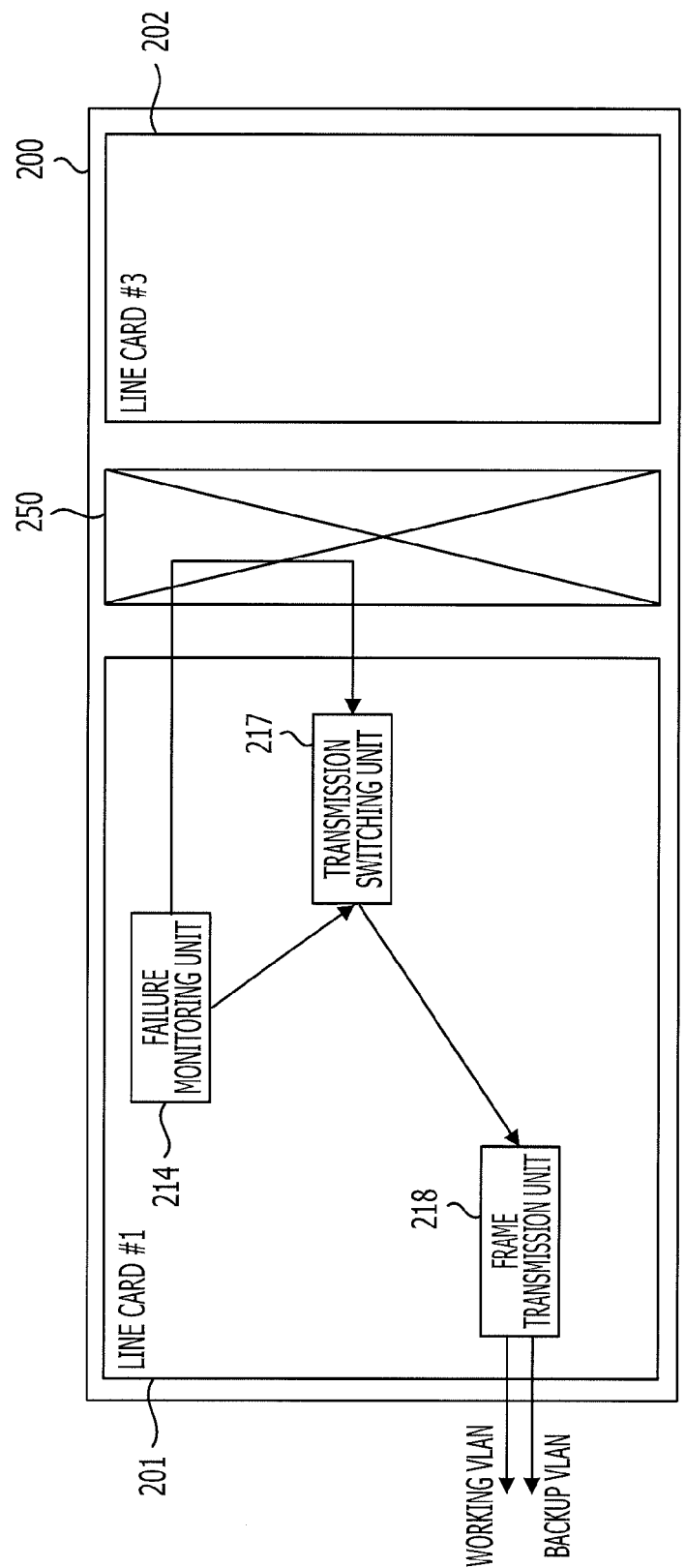
FIG. 2 is a diagram illustrating an exemplary configuration of a transmission system of the communication apparatus.

Next, an exemplary configuration of each of the communication apparatuses 100 to 300 according to the first embodiment will be described. FIG. 1 and FIG. 2 are diagrams illustrating an exemplary configuration of the communication apparatus 200 of the first embodiment. FIGS. 3A to 3C are diagrams illustrating exemplary tables. The configurations of the communication apparatuses 100 to 300 may be the same as one another, so the configuration of the communication apparatus 200 described herein may represent the other communication apparatuses.

FIG. 1 illustrates an exemplary configuration of a receiving system of the communication apparatus 200, where the receiving system receives a frame from the communication apparatus 100 and transmits the frame to the communication apparatus 300. FIG. 2 illustrates an exemplary configuration of a transmission system in the communication apparatus 200, where a frame is transmitted to the communication apparatus 100. Although these systems are separately illustrated in different drawings for the sake of description, the communication apparatus 200 may include the configurations of both the receiving system and the transmission system (for example, as illustrated in FIG. 1 and FIG. 2).

The communication apparatus 200 includes a line card #1 (201), a switch module 250, and a line card #3 (302).

For example, the line card #1 (201) is connected to the communication apparatus 100 through two VLANs, a working VLAN and a backup VLAN. Also the line card #3 (202) is connected to the communication apparatus 300 through two VLANs, a working VLAN and a backup VLAN.

The line card #1 (201) includes a frame receiver 211, an OAM extractor 212, a transfer processor 213, a failure monitor 214, a VLAN ID converter 225, and a VLAN ID conversion table 226.

The frame receiver 211 receives a frame transmitted from the communication apparatus 100 through the working VLAN or the backup VLAN and then outputs the frame to the OAM extractor 212. For example, the frame receiver 211 accepts a received frame when it is addressed to the communication apparatus 200, otherwise the receiver 211 discards the frame.

The OAM extractor 212 classifies the received frames and extracts OAM frames. In other words, each frame has an "Ethernet (registered trademark) type" region (for example, as illustrated in FIG. 37A), so that the OAM extractor 212 may determine whether the received frame is an OAM frame or not by identifying whether the region includes a mark or the like representing the OAM frame.

Furthermore, the OAM extractor 212 distinguishes between an OAM frame for monitoring an individual VLAN (for example, at a monitoring level of "K") and an OAM frame for monitoring a service (for example, at a monitoring level of "K+1") among the extracted OAM frames. Furthermore, the OAM extractor 212 outputs an individual-VLAN-monitoring OAM frame to the failure monitor 214 and outputs a service-monitoring OAM frame to the VLAN ID converter 225. For example, the OAM frame includes a "monitoring level" region (for example, as illustrated in FIG. 37B). The OAM extractor 212 discriminates the OAM frame from other frames based on a monitoring level inserted in the region.

The transfer processor 213 transmits, for example, a frame output from the OAM extractor 212 to the line card #3 (202) through a switch module 250 according to a MAC transfer table.

FIG. 3A is a diagram illustrating an exemplary MAC transfer table 2131. The MAC transfer table 2131 includes a "destination MAC (Media Access Control) address", a "receiving VLAN", a "transmission port", and a "transmission VLAN". In this example, the transfer processor 213 converts the VLAN ID of the received frame having the VLAN ID "2" and a destination MAC address "MACx" into VLAN ID "A" or "B" so that the received frame may be transmitted from the transmission port "30" or "40".

The VLAN ID converter 225 inputs a service monitoring OAM frame (for example, one at the monitoring level "K+1"), and converts the VLAN ID of the frame into another one according to the VLAN ID conversion table 226. For example, the VLAN ID converter 225 converts the VLAN ID of the service-monitoring OAM frame received from the backup VLAN into the VLAN ID of the working VLAN and then outputs the converted VLAN ID, while outputting the VLAN ID of the service-monitoring OAM frame received from the working VLAN without conversion. Alternatively, the VLAN ID converters 225 converts the service-monitoring OAM frame received from the working VLAN and the service-monitoring OAM frame received from the backup VLAN into a common VLAN ID and then outputs the converted VLAN ID.

Therefore, the VLAN ID converter 225 converts the service-monitoring OAM frame from the working VLAN and the service-monitoring OAM frame from the backup VLAN into frames having the same VLAN ID and then outputs these frames.

The VLAN ID conversion table 226 is a table retaining a VLAN ID or the like to be converted. FIG. 3B is a diagram illustrating an exemplary VLAN ID conversion table 226. The VLAN ID conversion table 226 includes a "receiving VLAN", a "failure-monitoring card number", and a "working VLAN receiving VLAN ID". For example, the "receiving VLAN ID" is the VLAN ID of the service-monitoring OAM frame to be served as a conversion target. For example, the "failure-monitoring card number" represents the number of the card having a failure-monitor for monitoring services and serves as a destination to where the service-monitoring OAM frame after the conversion is transferred. For example, the "working VLAN" represents a VLAN ID after conversion. Another example of the VLAN ID conversion table 226 is illustrated in, for example, FIG. 11A and the details thereof will be described in second and subsequent embodiments.

The failure monitor 214 accepts an OAM frame output from the OAM extractor 212 or the VLAN ID converter 225 and then performs a failure monitoring process. The failure monitor 214 monitors an individual VLAN based on an individual-VLAN-monitoring OAM frame and a service based on a service-monitoring OAM frame.

Various failure-monitoring processes may be performed. For example, one of the processes resets a timer when receiving a service-monitoring OAM frame to make the time count down a predetermined time and then resets the timer again when the service-monitoring OAM of the same VLAN ID is received. The failure monitor 214 detects a service failure when the timer is not reset and expires, while detecting that there is no failure when the time is not reset. Alternatively, for example, the failure monitor 214 detects the sequence number of the service-monitoring OAM frames of the same VLAN ID and determines that there is no failure when detecting sequential numbers and there is a failure when detecting discrete numbers.

Based on the VLAN ID of a frame output from the transfer processor 213, the switch module 250 transfers the frame to the line card #3 (202) of the destination port.

The line card #3 (202) includes a frame transmitter 231. The frame transmitter 231 transmits a frame transmitted from the transmission processor 213 to the communication apparatus 300 through the working VLAN or the backup VLAN.

<Exemplary Configuration of Transmission System>

FIG. 2 is a diagram illustrating an exemplary configuration of the transmission system of the communication apparatus 200. The communication apparatus 200 generates a service-monitoring OAM frame and transmits the frame to the communication apparatus 100 through the working VLAN or the backup VLAN.

The failure monitor 214 retains an OAM transmission-control table and generates a service-monitoring OAM frame based on this table, followed by transmitting the frame through the working VLAN or the backup VLAN.

FIG. 3C is a diagram illustrating an exemplary OAM transmission-control table 2141. The OAM transmission-control table 2141 includes a "destination port" and a "transmission VLAN ID" for the working VLAN and the backup VLAN. The "destination port" represents, for example, the transmission port number of a generated service-monitoring OAM frame. The "transmission VLAN ID" represents the VLAN ID of the VLAN through which the service-monitoring OAM frame is transmitted.

As illustrated in FIG. 2, the communication apparatus 200 further includes a transmission-switch 217 and a frame transmitter 218.

When the transmission-switch 217 accepts service-monitoring OAM frames from two or more failure-monitors through the switching module 250 and so on, the transmission-switch 217 selects one of the service-monitoring OAM frames. For example, when the transmission-switch 217 accepts one service-monitoring OAM frame from the failure monitor 214, the transmission-switch 217 outputs the OAM frame without switching.

The frame transmitter 218 transmits an OAM frame output from the transmission-switch 217 to the communication apparatus 100 through the working VLAN or the backup VLAN. For example, since "VLAN ID" is inserted into the service-monitoring OAM frame (FIG. 3C), the frame transmitter 218 transmits the OAM frame from the corresponding transmission port based on this VLAN ID.

<Exemplary Operation>

First, an exemplary operation of the receiving system will be described. As illustrated in FIG. 1, the working VLAN between the communication apparatus 200 and the communication apparatus 100 is in a steady (or normal) state, the communication apparatus 200 receives an individual-VLAN-monitoring OAM frame (for example, one at a monitoring level of "K") from the communication apparatus 100 through the working VLAN.

The OAM extractor 212 extracts the OAM frame and outputs the OAM frame to the failure monitor 214. Therefore, the failure monitor 214 is allowed to individually monitor the working VLAN between the communication apparatus 200 and the communication apparatus 100. Furthermore, the communication apparatus 200 receives an individual-VLAN-monitoring OAM frame from the backup VLAN. The OAM extractor 212 extracts and outputs the individual-VLAN-monitoring OAM frame to the failure monitor 214. Therefore, the failure monitor 214 may individually monitor the backup VLAN between the communication apparatus 200 and the communication apparatus 100.

When the working VLAN is in a steady state, the communication apparatus 200 receives a service-monitoring OAM frame (for example, one at a monitoring level of "K+1") from the communication apparatus 100 through the working VLAN. Then, the OAM extractor 212 extracts and outputs the service-monitoring OAM frame to the VLAN ID converter 225. Based on a VLAN ID conversion table 226, the VLAN ID converter 225 converts the VLAN ID of the frame into, for example, a common VLAN ID or does not convert the VLAN ID. Then, the VLAN ID converter 225 transmits the frame to the failure monitor 214 through the switch module 250.

On the other hand, when a failure occurs in the working VLAN between the communication apparatus 200 and the communication apparatus 100 and the path is changed to the backup VLAN, the communication apparatus 200 receives a service-monitoring OAM frame from the backup VLAN. Then, the OAM extractor 212 extracts and outputs the service-monitoring OAM frame to the VLAN ID converter 225. The VLAN ID converter 225 converts the VLAN ID of the OAM frame (into for example, a common VLAN ID or the VLAN ID of the working VLAN) according to the VLAN ID conversion table 226 and then transmits the OAM frame to the failure monitor 214 through the switch module 250.

Regarding service-monitoring OAM frames, the failure monitor 214 inputs a service-monitoring OAM frame received from the working VLAN and a service-monitoring OAM frame received from the backup VLAN as those of the same VLAN ID by conversion with the VLAN ID converter 225. Thus, both services may be monitored without distinguishing between them. Therefore, a service failure that occurs between the communication apparatus 200 and the communication apparatus 100 may be monitored without allowing the failure monitor 214 to cooperate with another monitor or the like.

On the other hand, the transfer processor 213 transmits a frame (for example, a data frame) output from the OAM extractor 212 according to the MAC transfer table 2131 (for example, as illustrated in FIG. 3A). For example, when the working VLAN between the communication apparatus 200 and the communication apparatus 300 is in a steady state, the transfer processor 213 converts the VLAN ID of the received frame into "A" and then transmits the frame to the frame transmitter 231 through the switch module 250. Both the switch module 250 and the frame transmitter 231 transmit, for example, the frame to the working VLAN between the communication apparatus 200 and the communication apparatus 300 based on the converted VLAN ID.

When a failure occurs in the working VLAN between the communication apparatus 200 and the communication apparatus 300, the transfer processor 213 converts the VLAN ID of the received frame into "B" and then transmits the frame to the frame transmitter 231 through the switch module 250. Both the switch module 250 and the frame transmitter 231 transmit, for example, the frame to the backup VLAN between the communication apparatus 200 and the communication apparatus 300 based on the converted VLAN ID.

When the path from the communication apparatus to the communication apparatus 300 is switched from the working VLAN to the backup VLAN by the transfer processor 213, the failure monitor 214 inputs service-monitoring OAM frames received from two paths without being influenced by the switching. This is because, for example, the transmission processor 213 is arranged subsequent to the OAM extraction part 212 and the extraction itself is not influenced even if the transfer destination is changed after the extraction of the service-monitoring OAM frame. Therefore, this communication apparatus 200 is able to avoid an erroneous detection with respect to a service failure without being influenced by the change of the path between the communication apparatus 200 and the communication apparatus 300.

Here, an exemplary operation of the transmission system is as follows. That is, as illustrated in FIG. 2, the failure monitor 214 generates a service-monitoring OAM frame and transmits the frame to the working VLAN or the backup VLAN according to the OAM transmission-control table 2141 (for example, as illustrated in FIG. 3C). For example, when the working VLAN is in a steady state, the failure monitor 214 transmits the generated service-monitoring OAM frame to the working VLAN through the switch module 250 and so on. On the other hand, when a failure occurs in the working VLAN, the failure monitor 214 transmits a service-monitoring OAM frame to the backup VLAN through the switch module 250 and so on. Therefore, the communication apparatus 200 may generate a service-monitoring OAM frame and transmits the service-monitoring OAM frame to the communication apparatus 100 depending on the state of the path between the communication apparatus 200 and the communication path 100.

<Second Embodiment>

Next, a second embodiment will be described. The second embodiment includes two sets of the respective line cards #1 (201) and # 3 (202) of the first embodiment (for example, those illustrated in FIG. 1).

Figure 4:
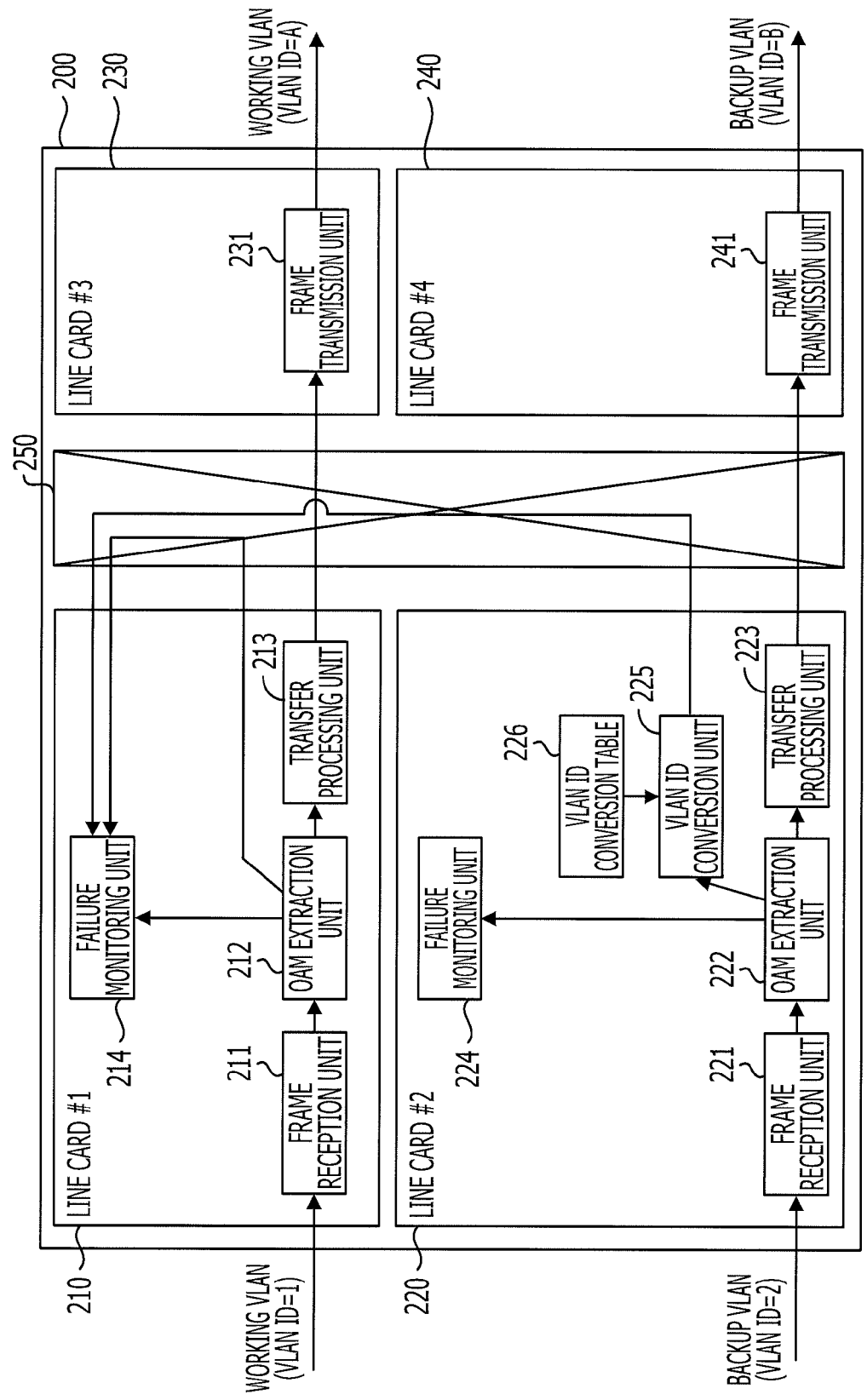
FIG. 4 is a diagram illustrating an exemplary configuration of a receiving system of a communication apparatus.
Figure 5:
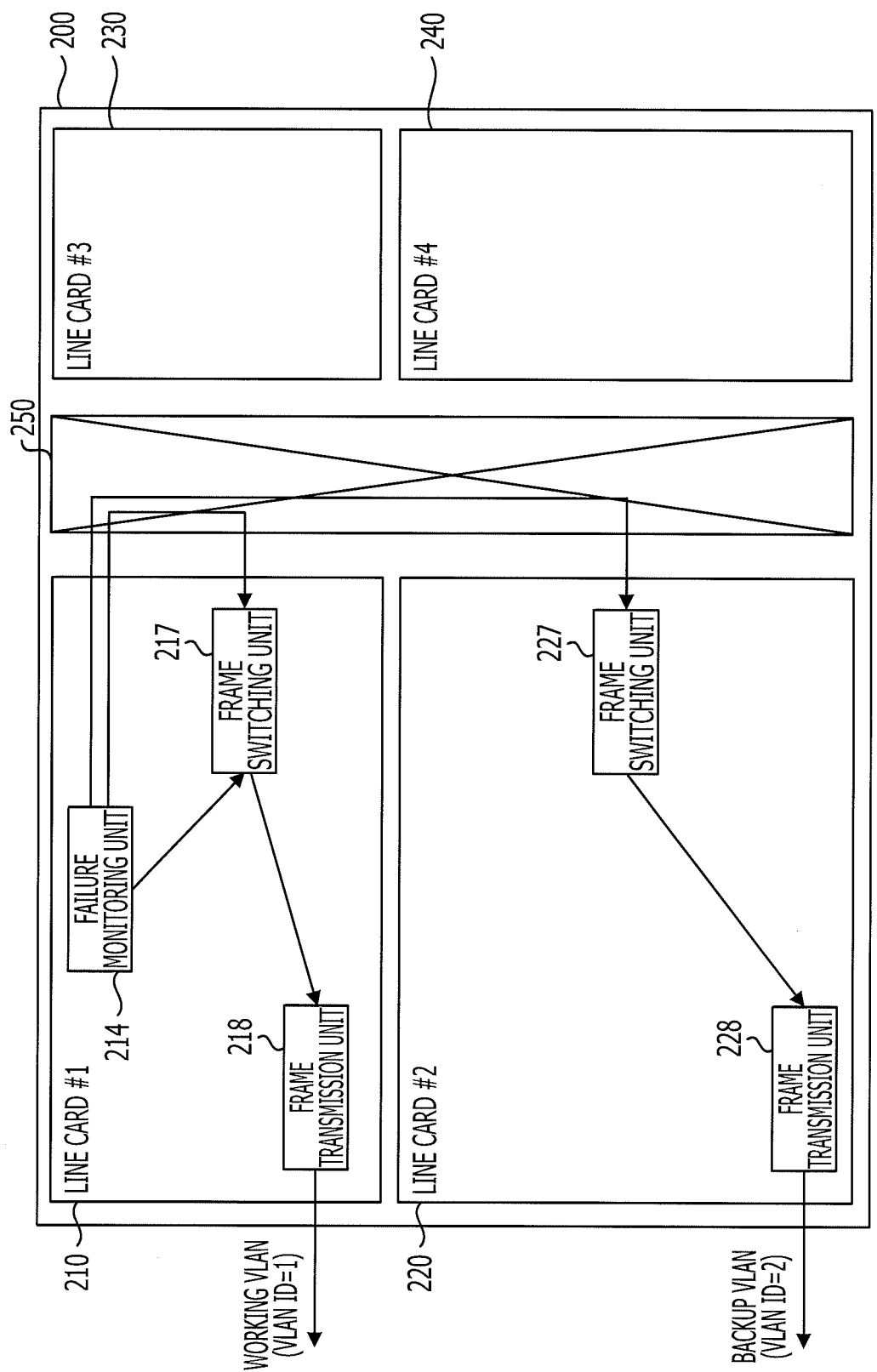
FIG. 5 is a diagram illustrating an exemplary configuration of a transmission system of the communication apparatus.
Figure 12:
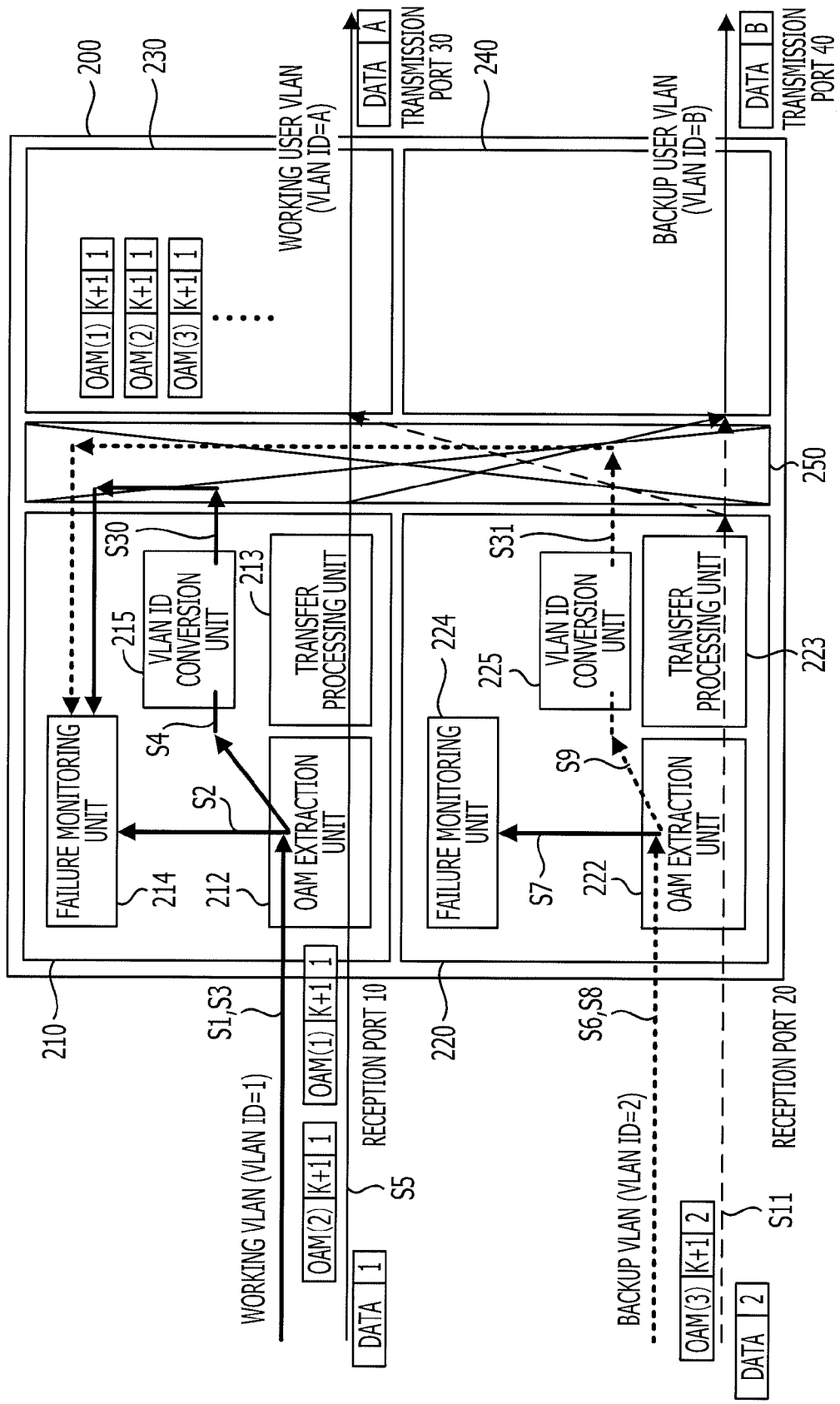
FIG. 12 is a diagram illustrating an exemplary operation of a communication apparatus.

FIG. 4 is a diagram illustrating an exemplary configuration of a receiving system of a communication apparatus 200 of the second embodiment. FIG. 5 is a diagram illustrating an exemplary configuration of a transmission system of the communication apparatus 200. FIG. 6 to FIG. 9 are diagrams illustrating exemplary operations. FIG. 10 is a diagram illustrating another exemplary configuration of the communication apparatus 200 of the second embodiment. FIG. 11A and FIG. 11B are diagrams illustrating exemplary tables. FIG. 12 is a diagram illustrating an exemplary operation of the communication apparatus 200.

<Exemplary Configuration>

As illustrated in FIG. 4, the communication apparatus 200 includes line cards #1 (210) to #4 (240) and a switch module 250. For example, the line card #1 (201) in FIG. 1 corresponds to the line card #1 (210) and the line card #2 (220) in FIG. 4. The line card #3 (202) in FIG. 1 corresponds to the line card #3 (230) and the line card #4 (240) in FIG. 4.

The line card #1 (210) is connected to a communication apparatus 100 through a working VLAN and the line card #2 (220) is connected to the communication apparatus 100 through a backup VLAN. On the other hand, the line card #3 (230) is connected to a communication apparatus 300 through the working VLAN and the line card #4 (240) is connected to the communication apparatus 300 through the backup VLAN.

In the example illustrated in FIG. 4, however, the line card #2 (220) includes a VLAN ID converter 225 and a VLAN ID conversion table 226, which are not included in the line card #1 (210).

In other words, the line card #1 (210) includes a frame receiver 211, an OAM extractor 212, a transfer processor 213, and a failure monitor 214. On the other hand, the line card #2 (220) includes a frame receiver 221, an OAM extractor 222, a transfer processor 223, a failure monitor 224, a VLAN ID converter 225, and a VLAN ID conversion table 226.

In the case of the example in FIG. 4, the OAM extractor 212 of the line card #1 (210) outputs an individual-VLAN-monitoring OAM frame among frames received through the working VLAN to the failure monitor 214, a VLAN ID converter 225, and a VLAN ID conversion table 226. In addition, the OAM extractor 212 transfers a service-monitoring OAM frame to the failure monitor 214 through the switch module 250. For example, the OAM extractor 212 determines an output destination with reference to the "monitoring level" in the OAM frame, such as the one illustrated in FIG. 33B. Furthermore, the OAM extractor 212 may carry out the direct output of the service-monitoring OAM frame to the failure monitor 214.

On the other hand, the OAM extractor 222 of the line card #2 (220) outputs an individual-VLAN-monitoring OAM frame to the failure monitor 224 among frames received through the backup VLAN. Then, the OAM extractor 222 outputs a service-monitoring OAM frame to the VLAN ID converter 225.

The VLAN ID converter 225 converts the VLAN ID (for example, "2") of the service-monitoring OAM frame received through the backup VLAN into another VLAN ID (for example, "1") according to a VLAN ID conversion table 226. The VLAN ID converter 225 transmits the service-monitoring OAM frame after the conversion to the line card #1 (210) in the failure monitor 214 for the service monitoring according to a VLAN ID conversion table 226.

The line cards #3 (230) and #4 (240) include the frame transmitters 231 and 241, respectively. The frame transmitters 231 and 241 transmit frames from transmission ports directed by the transmission processors 213 and 223, respectively. For example, the frame transmitters 231 and 241 transmit frames according to VLAN IDs which are converted by the transmission processor 213 and 223, respectively.

FIG. 5 is a diagram illustrating an exemplary configuration of the transmission system of the communication apparatus 200. The failure monitor 214 of the line card #1 (210) generates a service-monitoring OAM frame according to an OAM transfer control table (for example, as illustrated in FIG. 3C). Then, the frame is transmitted to either of the transmission switches 217 and 227 through the switch module 250. In this case, for example, the frame is transmitted by the switch module 250 based on the VLAN ID.

<Exemplary Operation of Receiving System>

Figure 6:
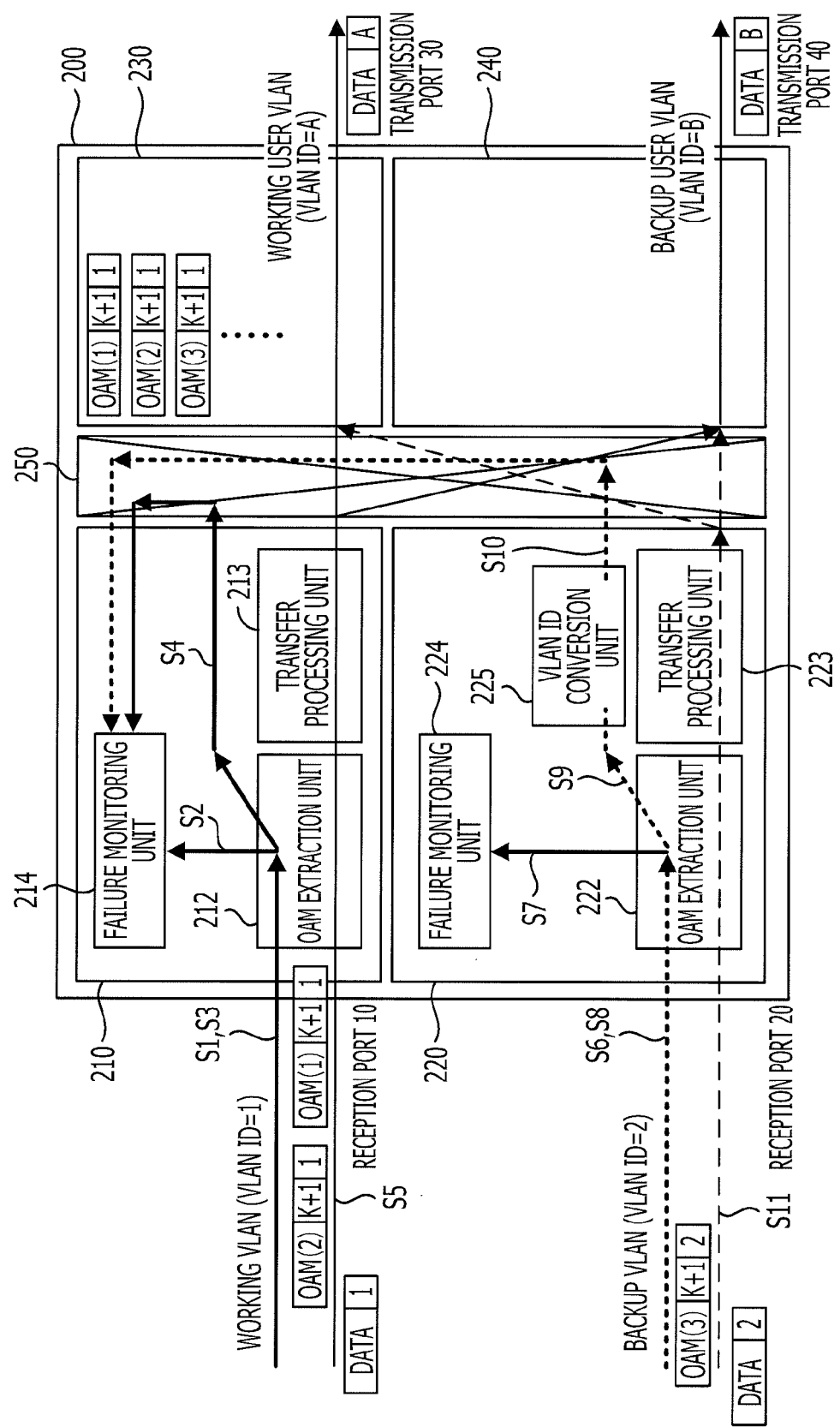
FIG. 6 is a diagram illustrating an exemplary operation of a communication apparatus.
Figure 7:
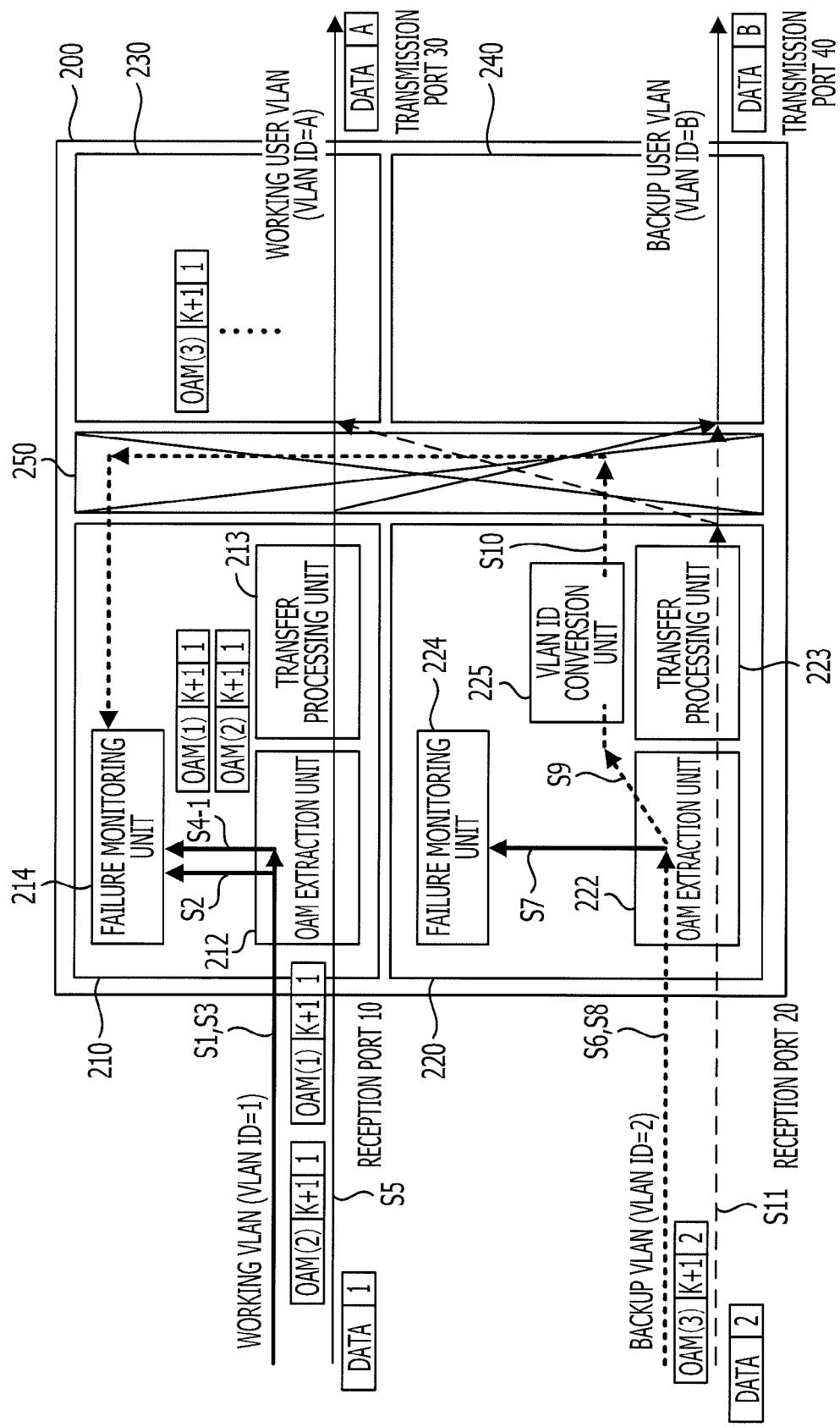
FIG. 7 is a diagram illustrating an exemplary operation of a communication apparatus.

Next, an exemplary operation of the communication apparatus 200 according to the second embodiment will be described. FIG. 6 and FIG. 7 are diagrams illustrating exemplary operations. However, in FIG. 6 and FIG. 7, the configuration of the communication apparatus 200 is partially omitted for convenience in description.

As illustrated in FIG. 6, when the communication apparatus 200 receives an individual-VLAN-monitoring OAM frame (such as one at a monitoring level of "K") from the communication apparatus 100 through the working VLAN, the OAM extractor 212 receives the frame (S1) and then transfers the frame to the failure monitor 214 (S2).

The failure monitor 214 accepts a working-VLAN-monitoring OAM frame to monitor a failure on the working VLAN between the communication apparatus 200 and the communication apparatus 100.

On the other hand, when the communication apparatus 200 receives a service-monitoring OAM frame (for example, one at a monitoring level of "K+1") through the working VLAN (S3), the OAM extractor 212 transmits the frame to the failure monitor 214 through the switch module 250 (S4).

For example, the OAM extractor 212 transfers the OAM frame to the failure monitor 214 when the "monitoring level" of the OAM frame (for example, as illustrated in FIG. 37B) is "K" and transfers the OAM frame to the failure monitor 214 when the "monitoring level" is "K+1".

Frames other than the OAM frame, which are extracted by the OAM extractor 212, are output to the transfer processor 213. The transfer processor 213 transfers the OAM frame to any of the line cards #3 (230) and #4 (240) through the switch module 250 according to the MAC transfer table 2131 (for example, as illustrated in FIG. 3A). For example, the transfer processor 213 transfers the OAM frame to the line card #3 (230) when the working VLAN between the communication apparatus 200 and the communication apparatus 300 is in a steady state (S5). On the other hand, when a failure occurs in the working VLAN between the communication apparatus 200 and the communication apparatus 300, the transfer processor 213 transfers the OAM frame to the line card #4 (240) so that a data frame may be transmitted from the backup VLAN.

On the other hand, when a failure or the like occurs in the working VLAN between the communication apparatus 200 and the communication apparatus 100 and the path is changed from the working VLAN to the backup VLAN, the OAM extractor 222 receives the OAM frame from the communication apparatus 100 (S6). In other words, when an individual-VLAN-monitoring OAM frame is received, the OAM extractor 222 outputs the OAM frame to the failure monitor 224 (S7). The failure monitor 224 monitors the individual-VLAN-monitoring OAM frame, thereby monitoring the failure of the backup VLAN after the path change.

Furthermore, when a service-monitoring OAM frame is received (S8), the OAM extractor 222 outputs the service-monitoring OAM frame to the VLAN ID converter 225 (S9).

The VLAN ID converter 225 converts the VLAN ID of the OAM frame into an ID (for example, "1") which represents the working VLAN according to a VLAN ID conversion table 226. The VLAN ID converter 225 transfers the converted OAM frame to the failure monitor 214 through the switch module 250 according to the VLAN ID conversion table 226 (S10).

Like the transfer processor 213, the transfer processor 223 also converts the VLAN ID of a frame output from the OAM extractor 222 and transfers the frame to either of the line cards #3 (230) and #4 (240) according to the MAC transfer table (S11).

The failure monitor 214 receives two OAM frames, i.e., a service-monitoring OAM frame received from the OAM extractor 212 through the switch module 250, and a service-monitoring OAM frame received from the VLAN ID converter 225. The VLAN ID of each of the OAM frames represents the VLAN ID of the working VLAN. Thus, the failure monitor 214 is able to monitor the OAM frames without distinguishing between the two OAM frames. As described above, the monitoring by the failure monitor 214 may be performed, for example, by using a timer or confirming the sequence numbers of frames.

Like the first embodiment, the service-monitoring OAM frame may be monitored by the failure monitor 214 without being influenced by a change in path between the communication apparatus 200 and the communication apparatus 300. For example, even if the path between the communication apparatus 200 and the communication apparatus 300 is switched from the working VLAN to the backup VLAN when the failure monitor 214 monitors the service-monitoring OAM frame received through the working VLAN between the communication apparatus 200 and the communication apparatus 100, the monitoring may be performed without being influenced by the switching. Like the first embodiment, for example, this is because the path is switched by the transfer processor 213 after the service-monitoring OAM frame is extracted by the OAM extractor 212.

In the exemplary operation illustrated in FIG. 6, the OAM extractor 212 is configured to output a service-monitoring OAM frame to the switch module 250. For example, the OAM extractor 212 may be configured to directly output the service-monitoring OAM frame to the failure monitor 214. An exemplary operation in this case will be described with reference to FIG. 7.

As illustrated in FIG. 7, the OAM extractor 212 also outputs a service-monitoring OAM frame to the failure monitor 214 (S4-1). Even in this case, the failure monitor 214 may monitor the service-monitoring OAM frame received from the working VLAN and the service-monitoring OAM frame received from the backup VLAN without distinguishing between their VLAN IDs. For example, when a service-monitoring OAM frame is input from the working VLAN, the OAM extractor 212 determines a frame type and so on based on the "VLAN ID" and the "Ethernet (registered trademark) type" in the frame and directly outputs the frame to the failure monitor 214.

<Exemplary Operation of Transmission System>

Figure 8:
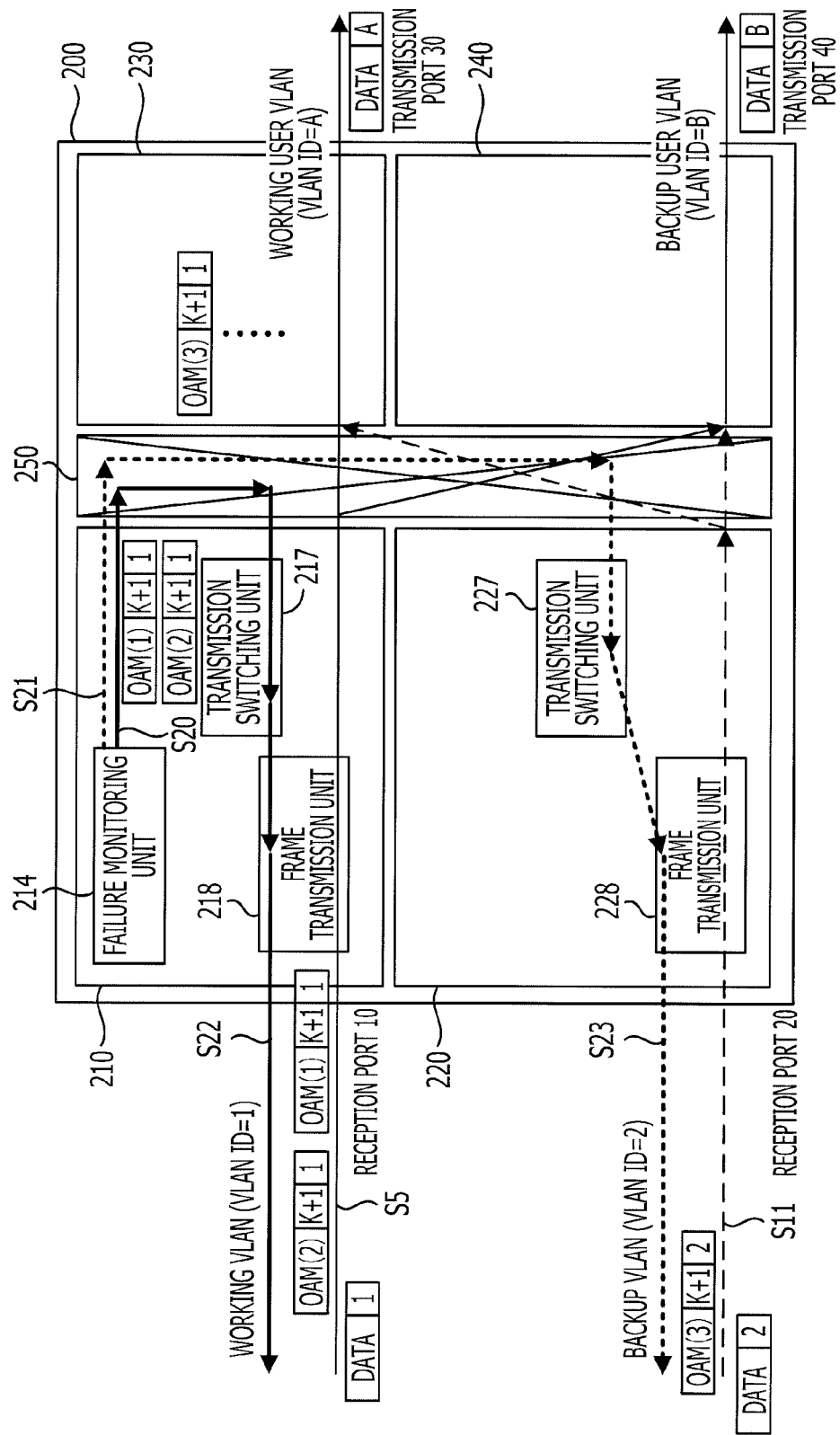
FIG. 8 is a diagram illustrating an exemplary operation of a communication apparatus.

Next, an exemplary operation of the transmission system will be described. FIG. 8 is a diagram illustrating an exemplary operation of the transmission system. The failure monitor 214 generates a service-monitoring OAM frame and transmits the frame to the communication apparatus 100 through the working VLAN or the backup VLAN according to the OAM transfer control table 2141.

More specifically, when the working VLAN is in a steady state, the failure-monitor 214 generates a service-monitoring OAM frame and transfers the frame to the transmission-switch 217 through the switch module 250 (S20). The switch module 250 transmits the frame, for example, to the transmission-switch 217 based on the VLAN ID (for example "1") in the frame.

The transmission-switch 217 outputs the transmitted OAM frame to the frame transmitter 218. The frame transmitter 218 transmits a service-monitoring OAM frame from the specified transmission port (such as one with a port number of "10"), for example, based on VLAN ID. Therefore, the service-monitoring OAM frame is transmitted to the communication apparatus 100 through the working VLAN (S22).

On the other hand, when a failure occurs in the working VLAN between the communication apparatus 200 and the communication apparatus 100, the failure monitor 214 generates a service-monitoring OAM frame and transmits the frame to the transmission-switch 227 through the switch module 250 (S21). The switch module 250 transmits the frame to the transmission-switch 227, for example, based on the VLAN ID (for example, "2").

The transmission-switch 227 outputs the frame to the frame transmitter 218. The frame transmitter 228 transmits the frame from the transmission port (for example, port number "20") specified, for example based on the VLAN ID. Therefore, when a failure occurs in the working VLAN, a service-monitoring OAM frame is transmitted to the communication apparatus 100 through the backup VLAN (S23).

Figure 9:
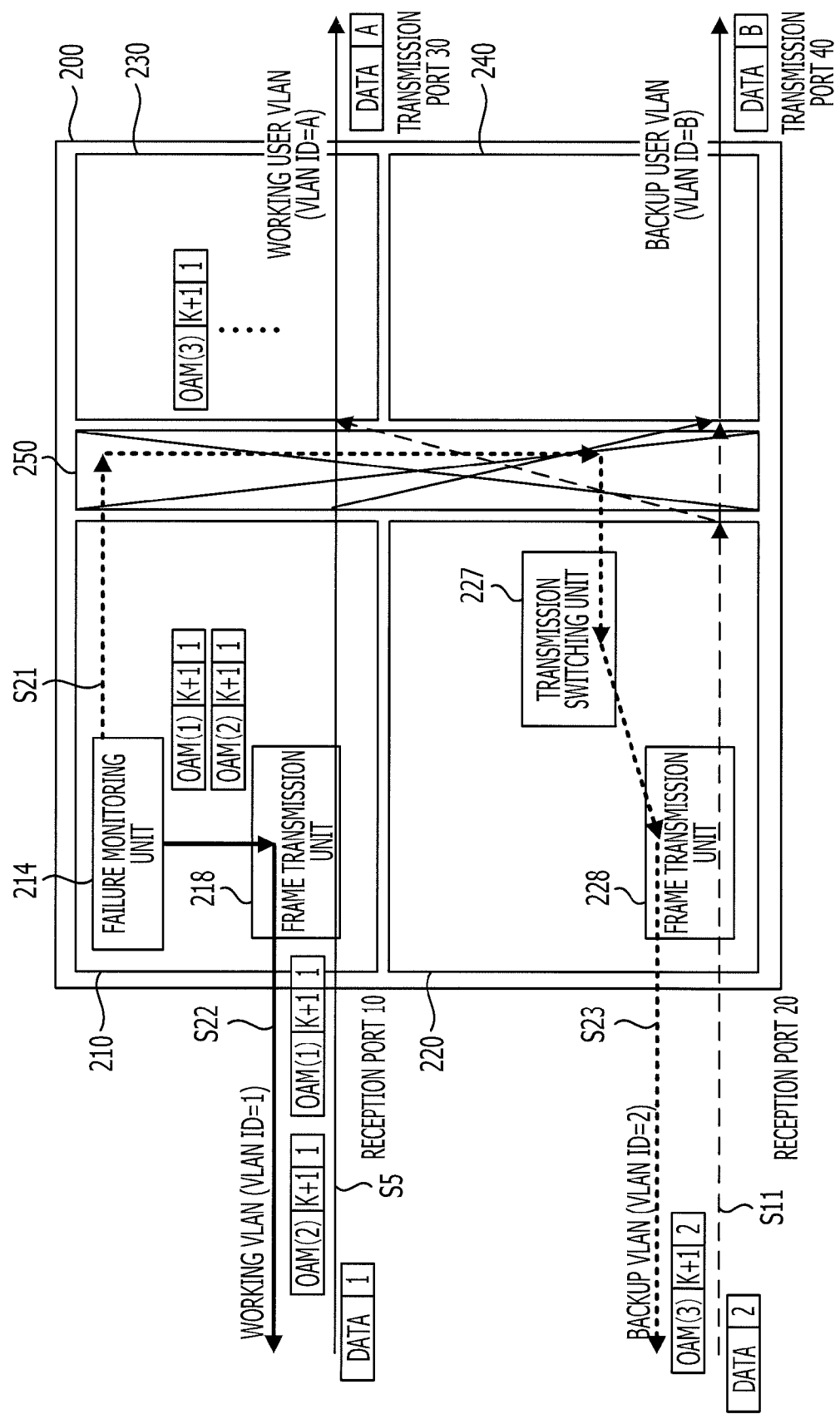
FIG. 9 is a diagram illustrating an exemplary operation of a communication apparatus.
Figure 10:
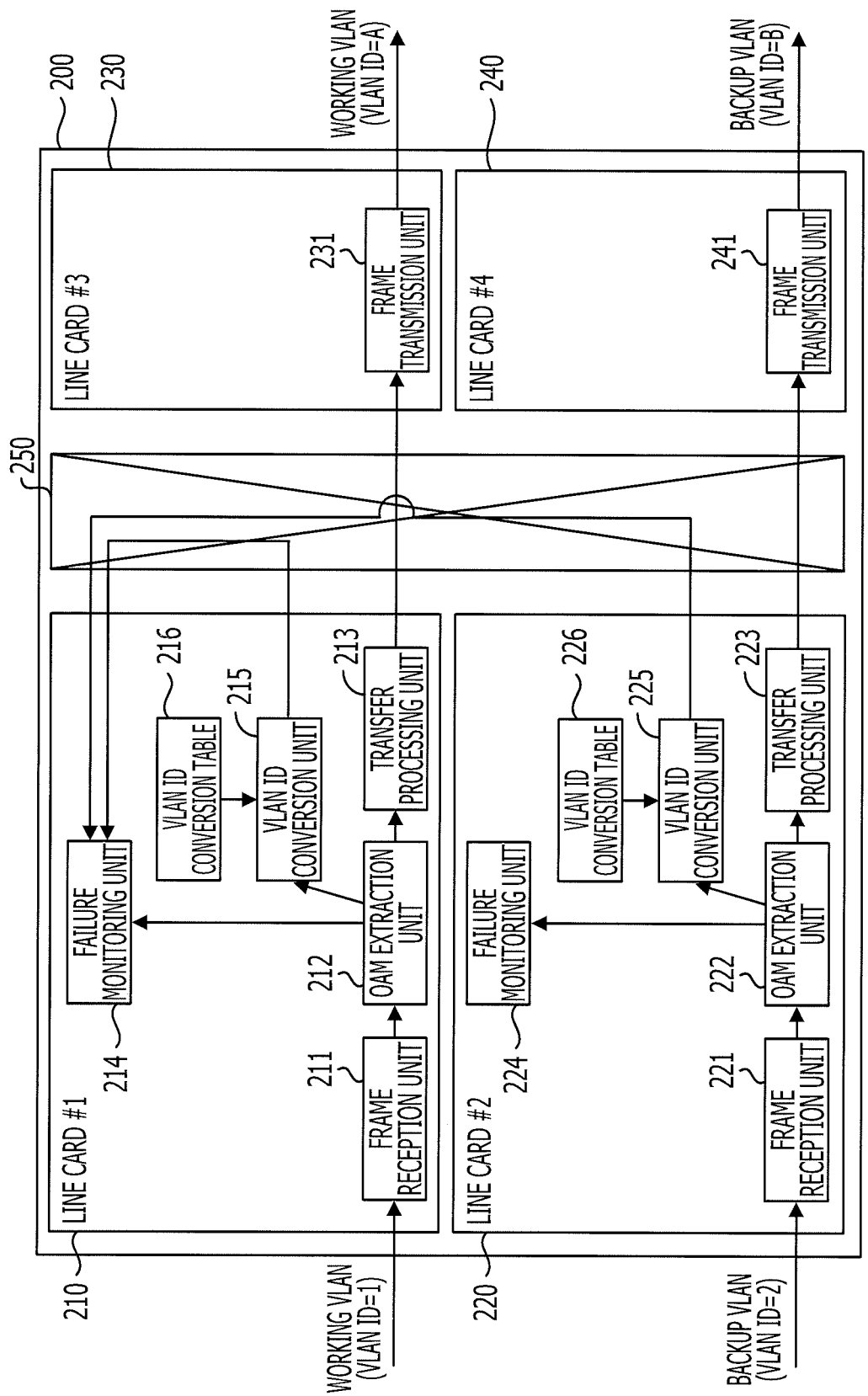
FIG. 10 is a diagram illustrating an exemplary configuration of a receiving system of a communication apparatus.

Like the example of the receiving system (for example, as illustrated in FIG. 7), as illustrated in FIG. 9, the failure monitor 214 may directly output a service-monitoring OAM frame to the frame transmitter 218 (S20-1). This OAM frame does not go through the switch module 250. Thus, the resource of the path in the switch module 250 may be reduced as compared with that of the case where the frame is output through the working VLAN or the backup VLAN.

Thus, in the second embodiment, the VLAN ID converter 225 sets the VLAN ID of a service-monitoring OAM frame received from the backup VLAN to the same ID as that of a service-monitoring OAM frame received from the working VLAN, followed by outputting the frame. Therefore, the failure monitor 214 inputs a service-monitoring OAM frame, without distinguishing the service-monitoring OAM frame from another service-monitoring OAM frame even if the path between the communication apparatus 200 and the communication apparatus 100 changes from the working VLAN to the backup VLAN. Thus, the failure monitor 214 may monitor two different paths without cooperating with other monitors or the like.

Even if the path between the communication apparatus 200 and the communication apparatus 300 is changed from the working VLAN to the backup VLAN, the failure monitor 214 may receive the service-monitoring OAM frame which is received from the communication apparatus 100 without being influenced by the change. Therefore, the erroneous detection of the failure may be prevented.

Next, modifications in the second embodiment will be described.

<First Modified Embodiment>

In this modification, the VLAN ID of the service-monitoring OAM frame received from the working VLAN and the VLAN ID of the service-monitoring OAM frame received from the backup VLAN are converted into a common VLAN ID. FIG. 10 is a diagram illustrating an exemplary configuration of the communication apparatus 200, FIG. 11A and FIG. 11B are diagrams illustrating exemplary tables, and FIG. 12 is a diagram illustrating an exemplary operation of the communication apparatus 200. Furthermore, the exemplary configuration and exemplary operation of the transmission system in the first modified embodiment are the same as those of the aforementioned embodiments as illustrated in FIGS. 5, 8, and 9.

As illustrated in FIG. 10, the communication apparatus 200 further includes a VLAN ID converter 215 and a VLAN ID conversion table 216 in the line card #1 (210).

The OAM extractor 212 of the line card #1 (210) outputs a service-monitoring OAM frame to the VLAN ID converter 215.

The VLAN ID converter 215 converts the VLAN ID of the service-monitoring OAM frame received from the working VLAN into a common VLAN ID based on a VLAN ID conversion table 216.

FIG. 11A is a diagram illustrating an exemplary VLAN ID conversion table 216. This VLAN ID conversion table 216 further includes a "common VLAN ID". The "common VLAN ID" represents, for example, the VLAN ID after the conversion. The same common VLAN ID is stored in the VLAN ID conversion table 226 of the line card #2 (220).

On the other hand, based on the VLAN ID conversion table 226, the VLAN ID converter 225 of the line card #2 (220) also converts the VLAN ID of the service-monitoring OAM frame into the common VLAN ID and outputs the common VLAN ID to the failure monitor 214. FIG. 11B is a diagram illustrating an exemplary VLAN ID conversion table 226. The VLAN ID conversion table 226 also includes the "common VLAN ID". In the examples of FIG. 11A and FIG. 11B, the VLAN ID of the service-monitoring OAM frame received by the working VLAN and the VLAN ID of the service-monitoring OAM frame received by the backup VLAN are converted into a common VLAN ID which is represented as "100".

FIG. 12 is a diagram illustrating an exemplary operation of the communication apparatus 1 in the first embodiment. The VLAN ID converter 215 of the line card #1 (210) converts the VLAN ID of a service-monitoring OAM frame from the VLAN ID of the working VLAN to the common VLAN ID (S30). The converted OAM frame is transferred to the failure monitor 214 from the switch module 250.

If a failure occurs in the working VLAN between the communication apparatus 200 and the communication apparatus 100, the path is changed from the working VLAN to the backup VLAN. Then, the VLAN ID converter 225 of the line card #2 (220) accepts the service-monitoring OAM frame from the backup VLAN. The VLAN ID converter 225 outputs the VLAN ID of the OAM frame after converting the VLAN ID to the common VLAN ID. The converted OAM frame is transmitted to the failure monitor 214 through the switch module 250.

Since the common VLAN ID is inserted into the service-monitoring OAM frame received from the working VLAN and into the service-monitoring OAM frame received from the backup VLAN, the failure monitor 214 may monitor both the OAM frames without distinguishing their VLAN IDs.

In this modified embodiment, therefore, the communication apparatus 200 brings service-monitoring OAM frames together in the failure monitor 214 even if the path between the communication apparatus 200 and the communication apparatus 100 is changed from the working VLAN to the backup VLAN. Since the common VLAN ID is inserted in each of the input OAM frames, the failure monitor 214 is able to monitor both of the input OAM frames without distinction. Therefore, the failure monitor 214 is allowed to monitor the service without cooperating with another monitor or the like.

Even if the path between communication apparatus 200 and the communication apparatus 300 is changed from the working VLAN to the backup VLAN, the VLAN ID converters 215 and 225 may convert the VLAN IDs of service-monitoring OAM frames into the common VLAN ID and output the OAM frame to the failure monitor 214 without being influenced by the change. Therefore, even if the path between the communication apparatus 200 and the communication apparatus 300 is changed, the failure monitor 214 is able to detect a failure in the service between the communication apparatus 200 and the communication apparatus 100 and prevent erroneous detection.

<Second Modified Embodiment>

Next, a second modified embodiment will be described. In the second modified embodiment, the failure-monitor for monitoring services is mounted on a card (or board) for exclusive use. FIG. 13 is a diagram illustrating an exemplary configuration of a communication apparatus 200 according to the second modified embodiment.

The communication apparatus 200 further includes a failure monitor card 255. In addition, the failure monitor card 255 includes a failure monitor 256.

In this case, like the embodiment as described above, the VLAN ID converter 225 converts the VLAN ID of the service-monitoring OAM frame received from the backup VLAN into the VLAN ID of the working VLAN. Alternatively, the VLAN ID converter 225 may also convert the VLAN ID of the service-monitoring OAM frame received from the working VLAN and the backup VLAN into the common VLAN ID.

FIG. 14A is a diagram illustrating an exemplary VLAN ID conversion table 226. In this case, for example, a "failure-monitoring card number" represents a card number (or board number) of a failure monitor card for exclusive use.

In the case of the second modified embodiment, both a service-monitoring OAM frame from the working VLAN and a service-monitoring OAM frame from the backup VLAN are collected by the failure monitor 256. At this time, these OAM frames have the same VLAN ID even if the path between the communication apparatus 100 and the communication apparatus 200 is changed. Thus, the failure monitor 256 may monitor services without distinguishing between the OAM frames even if the path between the communication apparatus 200 and the communication apparatus 300 is changed from the working VLAN to the backup VLAN.

Therefore, even if the path between the communication apparatus 200 and the communication apparatus 300 is changed, the failure monitor 256 may monitor the service to the communication apparatus 100. Thus, the failure monitor 214 may monitor a service without cooperating with another monitor or the like. Thus, even if the path between the communication apparatus 200 and the communication apparatus 300 is changed, erroneous detection of a service may be detected without being influenced by the change since the failure monitor 256 inputs a service-monitoring OAM frame.

FIG. 15 is a diagram illustrating an exemplary configuration of the communication apparatus 200 including a failure monitor card 255 for exclusive use in addition to two line cards #1 (210) and #2 (220). In this case, the OAM extractor 212 and the VLAN ID converter 225 are both configured to transmit a service-monitoring OAM frame to the failure monitor card 255 for exclusive use.

The OAM extractor 212 includes a failure-monitor position table retaining the transmission destination of the failure monitor 256 and transfers a service-monitoring OAM frame to the failure monitor card 255 according to this information.

FIG. 14B is a diagram representing an exemplary failure-monitor position table 2121. The failure-monitor position table 2121 includes a "receiving VLAN" and a "failure-monitoring card number". The "receiving VLAN" represents, for example, the VLAN ID of the target service-monitoring OAM frame. The "failure-monitoring card number" represents, for example, the card number of the failure monitor card 255 for exclusive use.

The VLAN ID converter 225 converts the VLAN ID of the OAM frame into the VLAN ID of the working VLAN according to the VLAN ID conversion table 226 and then performs transmission of the OAM frame according to the "failure-monitoring card number" (for example, as illustrated in FIG. 14A) stored in the VLAN ID conversion table 226.

FIG. 16 is a diagram illustrating an exemplary operation of the communication apparatus according to a second modified embodiment. The OAM extractor 212 of the line card #1 (210) transfers a service-monitoring OAM frame to the failure monitor card 255 according to the failure-monitor position table 2121 (S40).

On the other hand, when the path is changed from the working VLAN to the backup VLAN due to a failure of the working VLAN between the communication apparatus 200 and the communication apparatus 100, the OAM extractor 222 outputs a service-monitoring OAM frame to the VLAN ID converter 225 according to the VLAN ID conversion table 226 (S9).

The VLAN ID converter 225 makes the VLAN ID of the OAM frame the same as that of the working VLAN and transfers the OAM frame after the conversion to the failure monitor card 255 (S41).

The VLAN IDs of two service-monitoring OAM frames transferred from two line cards #1 (210) and #2 (220) are the same as the VLAN ID of the working VLAN. Therefore, the failure monitor 256 is able to process both of the OAM frames without difference and perform service monitoring.

Also in this modified embodiment, service-monitoring OAM frames received from both the working VLAN and the backup VLAN are brought together in one failure monitor 256. The failure monitor 256 accepts all the service-monitoring OAM frames with the inserted VLAN IDs which are the same as the VLAN ID of the working VLAN. Therefore, even if the path between the communication apparatus 200 and the communication apparatus 100 is changed, the failure monitor 256 may monitor a service without cooperating with other monitors or the like. Therefore, even if the path between the communication apparatus 200 and the communication apparatus 300 is changed, the failure monitor 256 may accept a service-monitoring OAM frame monitor without depending on the change. Thus, the failure monitor 256 may be prevented from erroneously detecting the service.

When the failure monitor card 255 for exclusive use is used, service-monitoring OAM frames are constantly output to the failure monitor card 255 for exclusive use. Thus, the "failure-monitoring card number" may be deleted from the VLAN ID conversion table 226 and the failure-monitor position table 2121. Therefore, the amount of information to be stored may be reduced as the OAM extractor 212 and the VLAN ID conversion table 226 does not retain the information about the "failure-monitoring card number".

The second embodiment has been described such that service monitoring is performed by the failure monitor 214 of the line card #1 (210), which is connected to the working VLAN, or the failure monitor 256 of the failure monitor card 255 for exclusive use. Alternatively, a service may be monitored in one of the failure monitors 214 and 256 and may disperse the load of the service monitoring. In this case, for example, the service-monitoring OAM frame may be output to one of the failure monitors 214 and 256 by changing the "failure-monitoring card number" in the VLAN ID conversion table 226 and the failure-monitor position table 2121.

<Third Embodiment>

Next, a third embodiment will be described. The aforementioned second embodiment has been described as one in which one failure monitor 214 or 256 monitors a service. In the third embodiment, a plurality of failure monitors a service. In FIG. 4, for example, a service may not be monitored by the failure monitor 214 when the line card #1 (210) itself breaks down. In this case, even though the backup VLAN between communication apparatus 200 and communication apparatus 100 is in an active state, the failure monitor 214 may not monitor this state and erroneously detect the state as a service failure. In the third embodiment, there are two or more failure monitors for monitoring services to prevent the erroneous detection.

Figure 17:
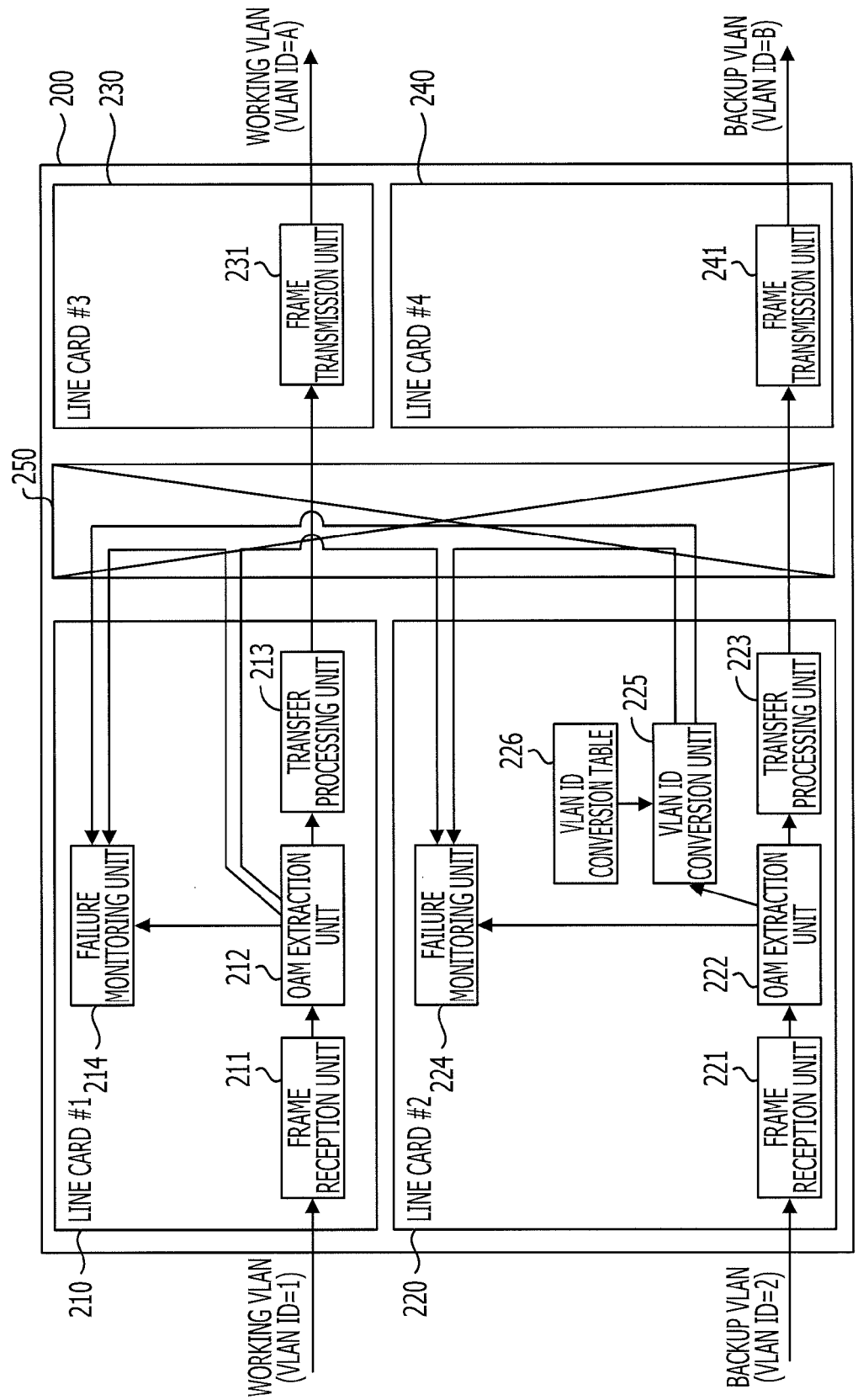
FIG. 17 is a diagram illustrating an exemplary configuration of a receiving system of a communication apparatus.

FIG. 17 is a diagram illustrating an exemplary configuration of the receiving system of the communication apparatus 200 according to the third embodiment. FIG. 18A and FIG. 18B are diagrams illustrating exemplary tables. FIG. 19 is a diagram illustrating an exemplary configuration of the transmission system of the communication apparatus 200, and FIGS. 20 to 23 are exemplary operations of the communication apparatus 200.

<Exemplary Configuration of Receiving System>

FIG. 17 is a diagram illustrating an exemplary configuration of the receiving system of the communication apparatus 200. Like the second embodiment (for example, as illustrated in FIG. 4), for example, the line card #1 (201) in FIG. 1 corresponds to a line card #1 (210) and a line card #2 (220) in FIG. 17. The line card #3 (202) in FIG. 1 corresponds to a line card #3 (230) and a line card #4 (240) in FIG. 17.

The OAM extractor 212 of the line card #1 (210) reproduces service-monitoring OAM frames, which are received through the working VLAN, and then transfers the reproduced frames to two failure monitors 214 and 224 of the respective line cards #1 (210) and #2 (220) according to the failure-monitor position table 2121.

FIG. 18A is a diagram illustrating an exemplary failure-monitor position table 2121. In the failure-monitor position table 2121 of the third embodiment, for example, all the card numbers in the failure monitors 214 and 224 are stored as "failure-monitoring card numbers". In this embodiment, a service-monitoring OAM frame is represented as one in which two card numbers "1000" and "2000" are stored and transmitted to two cards, the line card #1 (210) and the line card #2 (220).

On the other hand, the VLAN ID converter 225 of the line card #2 (220) conducts reproduction after converting the VLAN ID of the service-monitoring OAM frame received through the backup VLAN into the ID of the working VLAN. Then, the VLAN ID converter 225 transfers the service-monitoring OAM frame after the conversion to the failure monitor 214 of the line card #1 (210) and the failure monitor 224 of the line card #2 (220) according to the VLAN ID conversion table 226.

FIG. 18B is a diagram illustrating an exemplary VLAN ID conversion table 226. The "failure-monitoring card number" of the VLAN ID conversion table 226 represents, for example, all the card numbers in the failure monitors 214 and 224.

The failure monitor 214 of the line card #1 (210) accepts the service-monitoring OAM frame transferred from the OAM extractor 212 when the working VLAN for the communication apparatus 100 is in a steady state. The failure monitor 214 accepts the service-monitoring OAM frame transferred from the VLAN ID converter 225 when the path is changed to the backup VLAN. The failure monitor 214 monitors a service, for example, by monitoring the input OAM frame using a timer or the like.

The failure monitor 224 of the line card #2 (220) accepts a service-monitoring OAM frame transferred from the OAM extractor 212 when the working VLAN is in a steady state. The failure monitor 214 accepts a service-monitoring OAM frame transferred from the VLAN ID converter 225 when the path is changed to the backup VLAN. The failure monitor 224 also monitors a service, for example, by monitoring the input OAM frame using a timer or the like.

<Exemplary Configuration of Transmission System>

FIG. 19 is a diagram illustrating an exemplary configuration of the transmission system of the communication apparatus 200 according to the third embodiment. The failure monitor 214 of the line card #1 (210) transfers the OAM frame to one of the transmission-switches 217 and 227 according to the OAM transmission-control table 2141 (for example, as illustrated in FIG. 3C) in a manner similar to the second embodiment.

The failure monitor 224 of the line card #2 (220) generates a service-monitoring OAM frame according to the OAM transfer control table (for example, as illustrated in FIG. 3C) and then transfers the OAM frame to one of the transmission-switches 217 and 227.

Transmission-switch 217 accepts the service-monitoring OAM frames of the same VLAN ID (for example, the same as the VLAN ID of the working VLAN) from the two failure monitors 214 and 224. The transmission-switch 217 outputs one of the service-monitoring OAM frames to the frame transmitter 218. For example, the transmission-switch 217 outputs the service-monitoring OAM frame transmitted from the failure monitor 214 to the frame transmitter 218. The frame transmitter 218 transmits the service-monitoring OAM frame to the communication apparatus 100 through the working VLAN.

Transmission-switch 227 accepts service-monitoring OAM frames with the same VLAN ID (for example, the same as the VLAN ID of the backup VLAN) from the two failure monitors 214 and 224. Also in this case, the transmission-switch 227 outputs the service-monitoring OAM frame from one of failure monitors, for example the failure monitor 224, to the frame transmitter 228.

The failure monitor 214 may carry out the direct output of the service-monitoring OAM frame, which is output to the transmission-switch 217, to the transmission-switch 217 without passing through the switch module 250. The failure monitor 224 may also carry out the direct output of the service-monitoring OAM frame, which is output to the transmission-switch 227, to the transmission-switch 217.

<Exemplary Operation>

Figure 20:
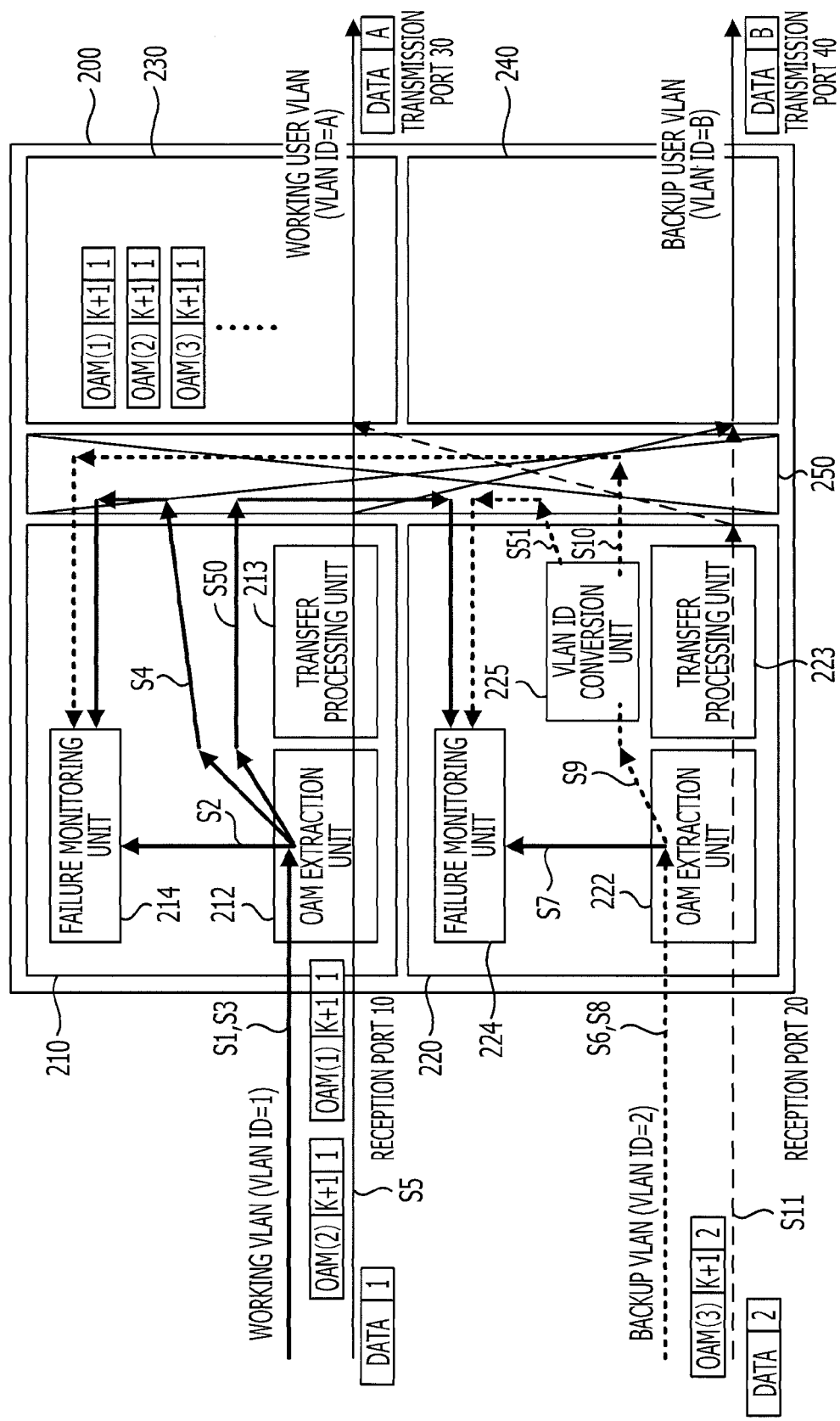
FIG. 20 is a diagram illustrating an exemplary operation of a communication apparatus.
Figure 21:
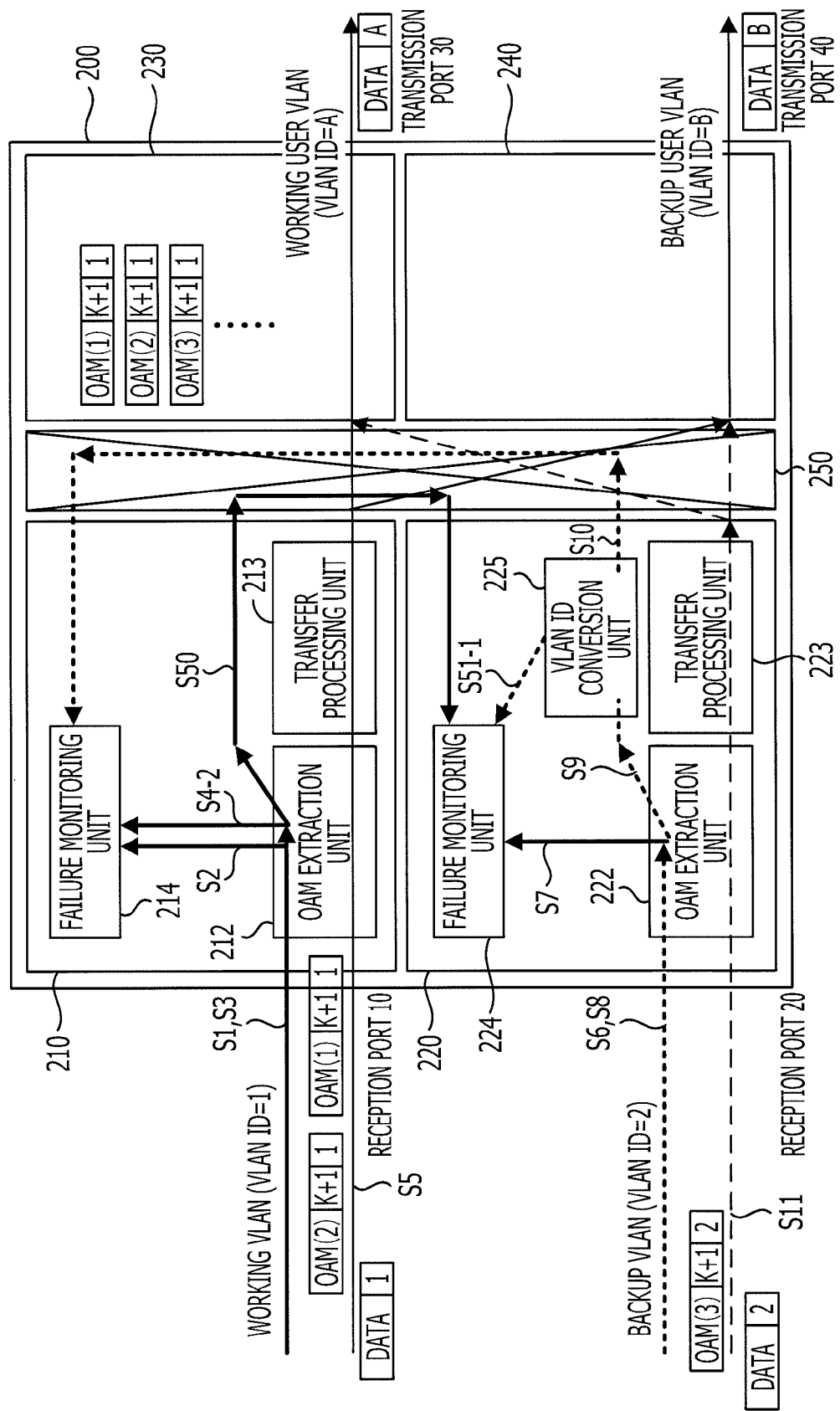
FIG. 21 is a diagram illustrating an exemplary operation of a communication apparatus.
Figure 22:
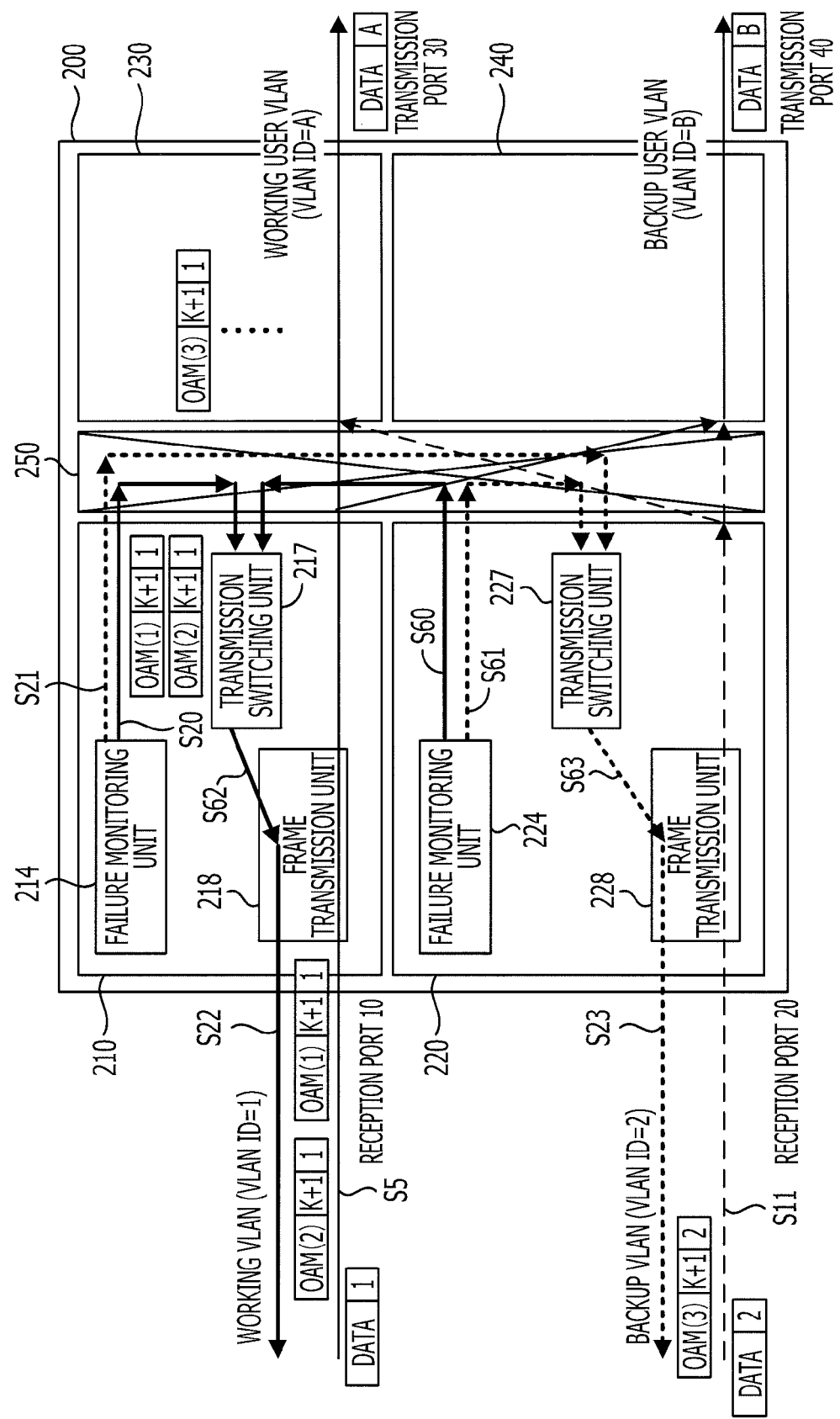
FIG. 22 is a diagram illustrating an exemplary operation of a communication apparatus.
Figure 23:
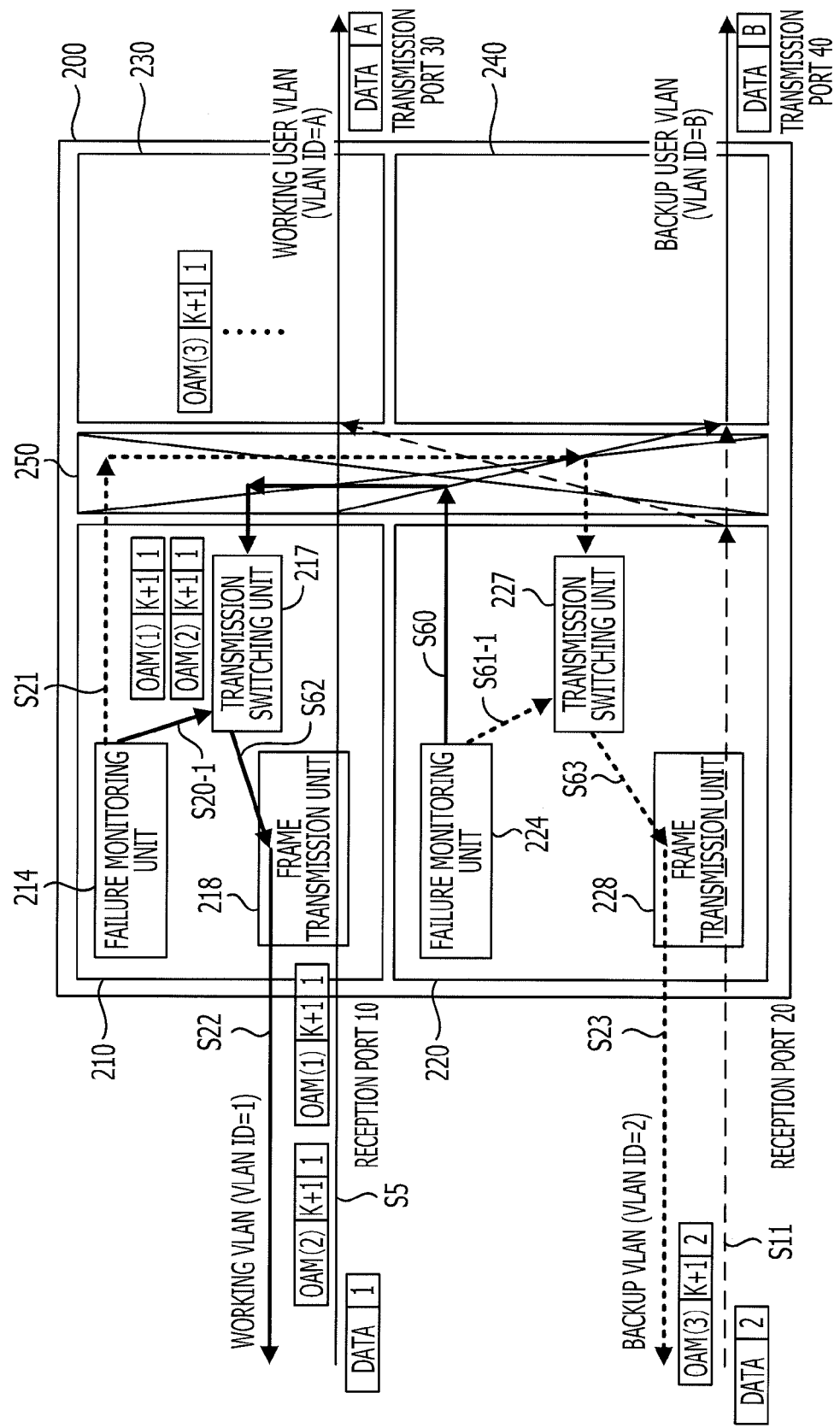
FIG. 23 is a diagram illustrating an exemplary operation of a communication apparatus.

Next, an exemplary operation of the communication apparatus 200 according to the third embodiment will be described. FIG. 20 and FIG. 21 are diagrams illustrating exemplary operations of a receiving system of the communication apparatus 200. FIG. 22 and FIG. 23 are diagrams illustrating exemplary operations of a transmission system of the communication apparatus 200. Like the second embodiment, the third embodiment will be described while omitting part of the configuration for the sake of convenience.

As illustrated in FIG. 20, when the communication apparatus 200 receives a service-monitoring OAM frame from the communication apparatus 100 through the working VLAN, the OAM extractor 212 reproduces the OAM frame. Then, the OAM extractor 212 transfers the OAM frame to the two failure monitors 214 and 224 through the switch module 250 according to the failure-monitor position table 2121 (S4, S50).

At this time, for example, when a failure occurs in the working VLAN between the communication apparatus 200 and the communication apparatus 300, the transfer processor 213 changes the path from the working VLAN to the backup VLAN and transmits a data frame or the like to the communication apparatus 300. However, the service-monitoring OAM frame is output to the two failure monitors 214 and 224 without influencing this path switching.

On the other hand, when a failure occurs in the working VLAN between the communication apparatus 200 and the communication apparatus 100, the path is changed from the working VLAN to the backup VLAN. At this time, the input service-monitoring OAM frame, which is input through the backup VLAN, is input into the VLAN ID converter 225 through the OAM extractor 222 (S9).

The VLAN ID converter 225 sets the VLAN ID of the input service-monitoring OAM frame to the same VLAN ID as that of the working VLAN in a manner similar to the first embodiment or the like and then reproduces the OAM frame. Then, the VLAN ID converter 225 transfers the OAM frame to the two failure monitors 214 and 224 through the switch module 250 according to the VLAN ID conversion table 226 (S10, S51).

Even if the path between the communication apparatus 200 and the communication apparatus 300 is changed from the working VLAN to the backup VLAN at this time, the OAM frame is transferred to each of the failure monitors 214 and 224 without being influenced by the change.

When the communication apparatus 200 receives a service-monitoring OAM frame from the working VLAN, each of the failure monitors 214 and 224 accepts the service-monitoring OAM frames (S4, S50). When the communication apparatus 200 receives a service-monitoring OAM frame from the backup VLAN, the two failure monitors 214 and 224 accepts the service-monitoring OAM frame (S10, S51). Both the failure monitors 214 and 224 may monitor a service using timers or the like for service-monitoring OAM frames.

Thus, even if the path between the communication apparatus 200 and the communication apparatus 300 is changed, both the failure monitors 214 and 224 accept the service-monitoring OAM frames of the same VLAN ID. Therefore, for example, even if a failure occurs in the line card #1 (210) or the line card #2 (220), a service may be monitored by either the failure monitor 214 of the line card #1 (210) or the failure monitor 224 of the line card #2 (220).

When two failure monitors 214 and 224 perform service monitoring, a service failure may be detected as follows. For example, even if the service monitoring with one of the failure monitors 214 or 224 is not performed, it is determined that there is no service failure when the service monitoring by the other of the failure monitors 214 or 224 is performed and the service is concluded as normal.

On the other hand, when both the failure monitors 214 and 224 including one where the service monitoring is not performed now does not receive any service-monitoring OAM frame for a certain period of time, it is determined that there is a service failure. The detection of a service failure as described above may be realized by, for example, allowing each of the failure monitors 214 and 224 to notify an upper apparatus, which is connected to each of the failure monitor 214 and 224, of the presence or absence of a service failure.

Furthermore, the embodiment has been described as one in which all the reproduced service-monitoring OAM frames are output to the failure monitors 214 and 224 through the switch module 250. Alternatively, for example, it may be configured in a manner similar to the second embodiment such that the OAM frames output to the failure monitors 214 of the line card #1 (210) and the failure monitor #2 (220) of the line card #2 are transferred without passing through the switch module 250.

FIG. 21 is a diagram illustrating an exemplary operation in the above situation. The OAM extractor 212 of line card #1 (210) directly outputs one of the reproduced service-monitoring OAM frames to the failure monitor 214 (S4-2). On the other hand, the VLAN ID converter 225 also directly outputs one of the reproduced service-monitoring OAM frames to the failure monitor 224 (S51-1).

Next, an exemplary operation of a transmission system in the third embodiment will be described. FIG. 22 and FIG. 23 are diagrams illustrating exemplary operations.

As illustrated in FIG. 22, the failure monitor 214 generates a service-monitoring OAM frame according to the OAM transmission-control table 2141 (for example, as illustrated in FIG. 3C). Then, the failure monitor 214 transfers the OAM frame to the transmission-switch 217 when the working VLAN is in a steady state (S20). On the other hand, the failure monitor 214 transfers the OAM frame to the transmission-switch 227 when a failure occurs in the working VLAN (S21).

The failure monitor 224 also generates a service-monitoring OAM frame according to the OAM transmission-control table 2241 (for example, as illustrated in FIG. 3C). Then, the failure monitor 224 transfers the OAM frame to the transmission-switch 217, when the working VLAN is in a steady state (S60). On the other hand, the failure monitor 224 transfers the OAM frame to the transmission-switch 227 when a failure occurs in a working VLAN (S61).

The transmission-switch 217 accepts the service-monitoring OAM frames output from the two failure monitors 214 and 224 and outputs one of the service-monitoring OAM frames (for example, the one from the failure monitor 214) to the frame transmitter 218. Therefore, a service-monitoring OAM frame is transmitted from the working VLAN when the working VLAN is in a steady state.

The transmission-switch 227 accepts service-monitoring OAM frames output from the two failure monitors 214 and 224 and outputs one of the service-monitoring OAM frames (for example, the one from the failure monitor 224) to the frame transmitter 228. Therefore, a service-monitoring OAM frame is transmitted from the backup VLAN when a failure occurs in the working VLAN.

In the transmission system, as in the case of the receiving system, when service-monitoring OAM frames are output to the transmission-switch 217 in line card #1 (210) and the transmission-switch 227 in the line card #2 (220), the service-monitoring OAM frames may be directly output to the transmission-switches 217 and 227 without passing through the switch module 250.

An exemplary operation in this case will be described with reference to FIG. 23. As illustrated in FIG. 23, the failure monitor 214 outputs the generated service-monitoring OAM frame directly to the transmission-switch 217 when the working VLAN between the communication apparatus 200 and the communication apparatus 100 is in a steady state (S20-1). On the other hand, when a failure occurs in the working VLAN between the communication apparatus 200 and the communication apparatus 100, the failure monitor 224 directly outputs the generated service-monitoring OAM frame to the transmission-switch 227 (S61-1).

As described above, in the third embodiment, even if the path between the communication apparatus 200 and the communication apparatus 100 is changed, each of the failure monitors 214 and 224 may accept a service-monitoring OAM frame and monitor a service. In this case, each of the failure monitors 214 and 224 may monitor the service without the mutual exchange of information. Thus, service monitoring may be performed without mutual cooperation. Even if the path between the communication apparatus 200 and the communication apparatus 300 is changed, since each failure monitor 214 and 224 may input a service-monitoring OAM frame, without influencing a change, the erroneous detection of the service failure by the change concerned may be prevented.

In the third embodiment, furthermore, each of the failure monitors 214 and 224 is deployed to monitor a service failure. Therefore, even when one of the line card #1 (210) and the line card #2 (220) itself has a failure, the failure monitor 214 or 224 of the other of the line card #1 (210) or #2 (220) may monitor a service failure.

The third embodiment has been described as one in which the VLAN ID of the service-monitoring OAM frame received by the VLAN ID converter 225 through the backup VLAN is made the same as that of the working VLAN and transferred. Like the first modified embodiment of the second embodiment, the VLAN IDs of two service-monitoring OAM frames received from the working VLAN and the backup VLAN may be converted into the common VLAN ID.

Figure 34:
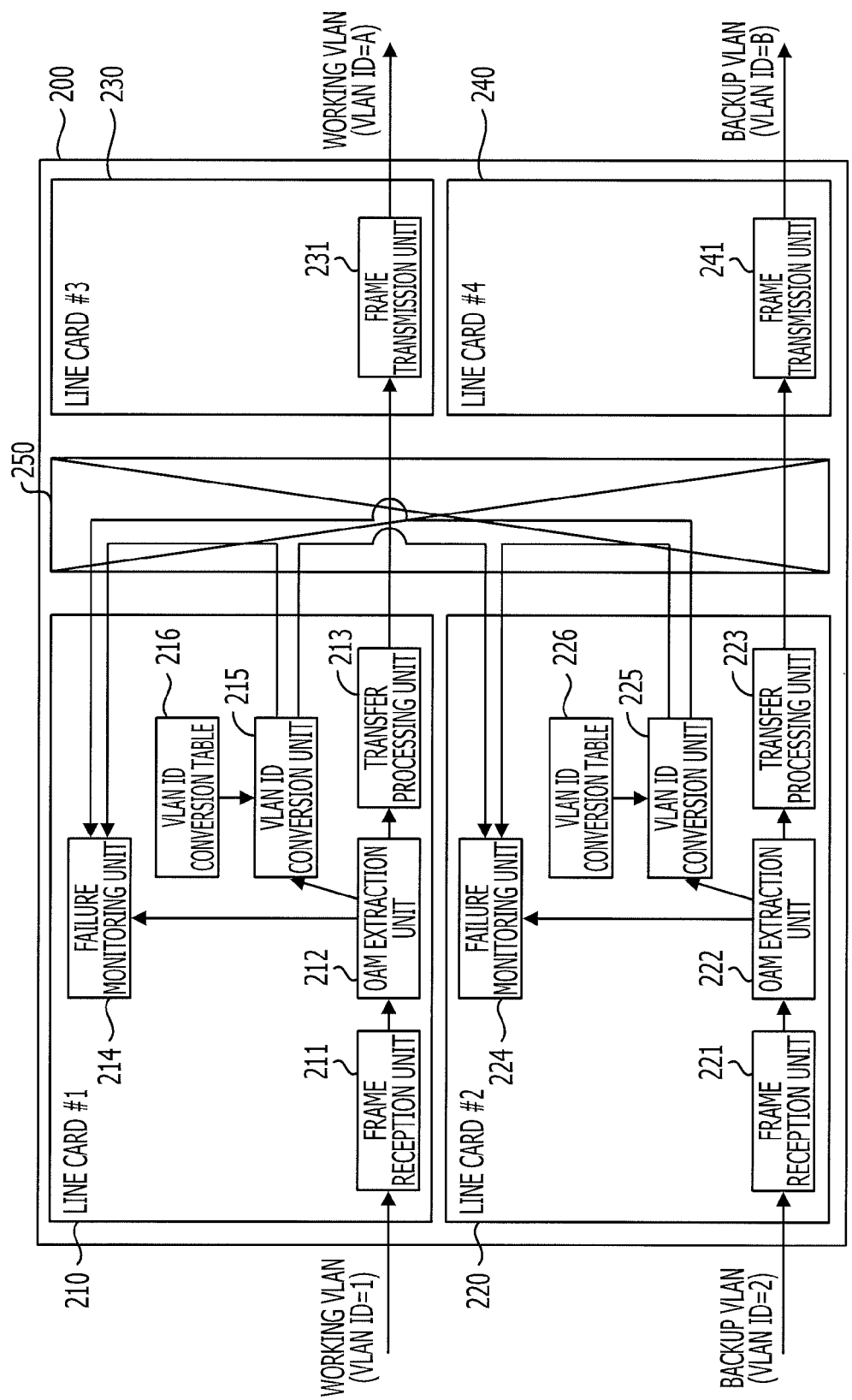
FIG. 34 is a diagram illustrating an exemplary configuration of a receiving system of a communication apparatus.

FIG. 34 is a diagram illustrating an exemplary configuration of the communication apparatus 200 in this case. Two VLAN ID converters 215 and 225 convert the VLAN IDs of the service-monitoring OAM frames, which are received from the working VLAN and the backup VLAN, into the common VLAN IDs and then reproduce these frames. The VLAN ID converter 215 outputs the reproduced OAM frames to the two failure monitors 214 and 224, respectively. The VLAN ID converter 225 also outputs the reproduced OAM frames to the two failure monitors 214 and 224. Therefore, the service monitoring may be performed in a manner similar to the third embodiment as described above.

<Fourth Embodiment>

The first to third embodiments have been described as those in which services are monitored using, for example, VLAN IDs. A fourth embodiment will be described as one in which a service is monitored using a service identifier.

Figure 24:
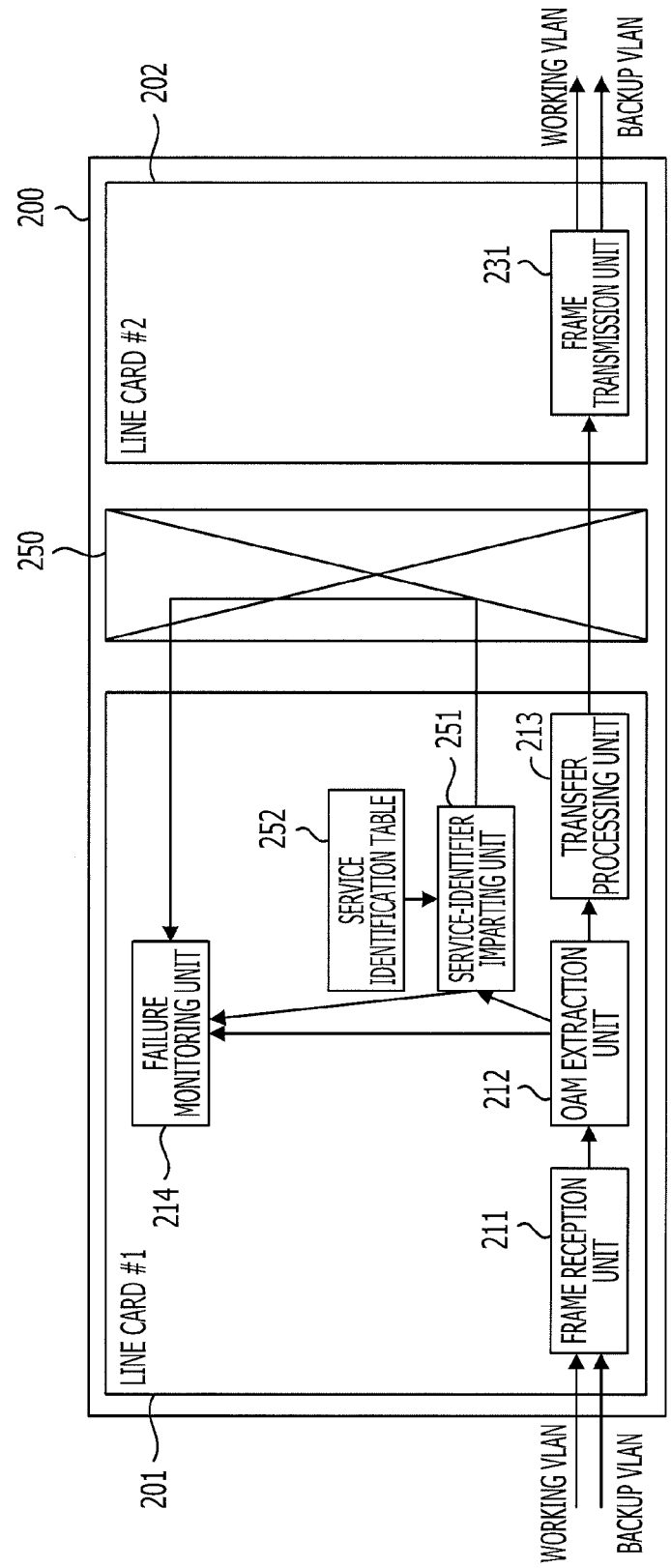
FIG. 24 is a diagram illustrating an exemplary configuration of a receiving system of a communication apparatus.

FIG. 24 is a diagram illustrating an exemplary configuration of the receiving system of the communication apparatus 200. A configuration example of the transmission system is illustrated in FIG. 2 as in the case of the first embodiment.

As illustrated in FIG. 24, the communication apparatus 200 further includes a service-identifier provider 251 and a service identification table 252.

The service identifier provider 251 accepts a service-monitoring OAM frame (for example, one at a monitoring level of "K+1") extracted by the OAM extractor 212, and provides the OAM frame with a service identifier according to the service identification table 252. The service-identifier provider 251 transfers the service-monitoring OAM frame with the service identifier through the switch module 250 to a line card (or board) having a failure-monitor for monitoring services according to the service identification table 252.

The service identification table 252 retains the service identifier to be provided. FIG. 25A is a diagram illustrating an exemplary service identification table 252. The service identification table 252 includes "receiving VLAN", "failure-monitoring card number", and "service identifier". For example, the "service identifier" represents a service identifier to be given to a service-monitoring OAM frame, for example.

The operation of the receiving system in FIG. 24 is, for example, as follows. That is, as in the case of the first embodiment or the like, the OAM extractor 212 extracts service-monitoring OAM frames, which are received from the working VLAN and the backup VLAN connected to the communication apparatus 100, and outputs the service-monitoring OAM frames to the service-identifier provider 251.

The service-identifier provider 251 gives a service identifier (for example, "100") to both the OAM frame received from the working VLAN and the OAM frame received from the backup VLAN, and then the OAM frames are transmitted to the failure monitor 214.

The failure monitor 214 monitors a service using a timer or the like on the service-monitoring OAM frame from each of the two paths.

Furthermore, as in the case of the first embodiment or the like, the transfer processor 213 transmits frames other than those extracted by the OAM extractor 212 to the working VLAN or the backup VLAN, which is connected to the communication apparatus 300, according to the MAC transfer table 2131 (for example, as illustrated in FIG. 3A).

Therefore, in the fourth embodiment, the service-monitoring OAM frame received through the working VLAN and the service-monitoring OAM frame received through the backup VLAN are provided with the same service identifier and input into the failure monitor 214. The failure monitor 214 may process two identical OAM frames without distinguishing between them and may monitor service between the communication apparatus 200 and the communication apparatus 100.

Even if the path between the communication apparatus 200 and the communication apparatus 300 is changed from the working VLAN to the backup VLAN, a service-monitoring OAM frame is input into the failure monitor 214 through the service-identifier provider 251 or the like. Thus, it is not influenced by the change. Therefore, the communication apparatus 200 is able to prevent erroneous detection of a service failure between the communication apparatus 200 and the communication apparatus 100 by the change of the path.

Figure 35:
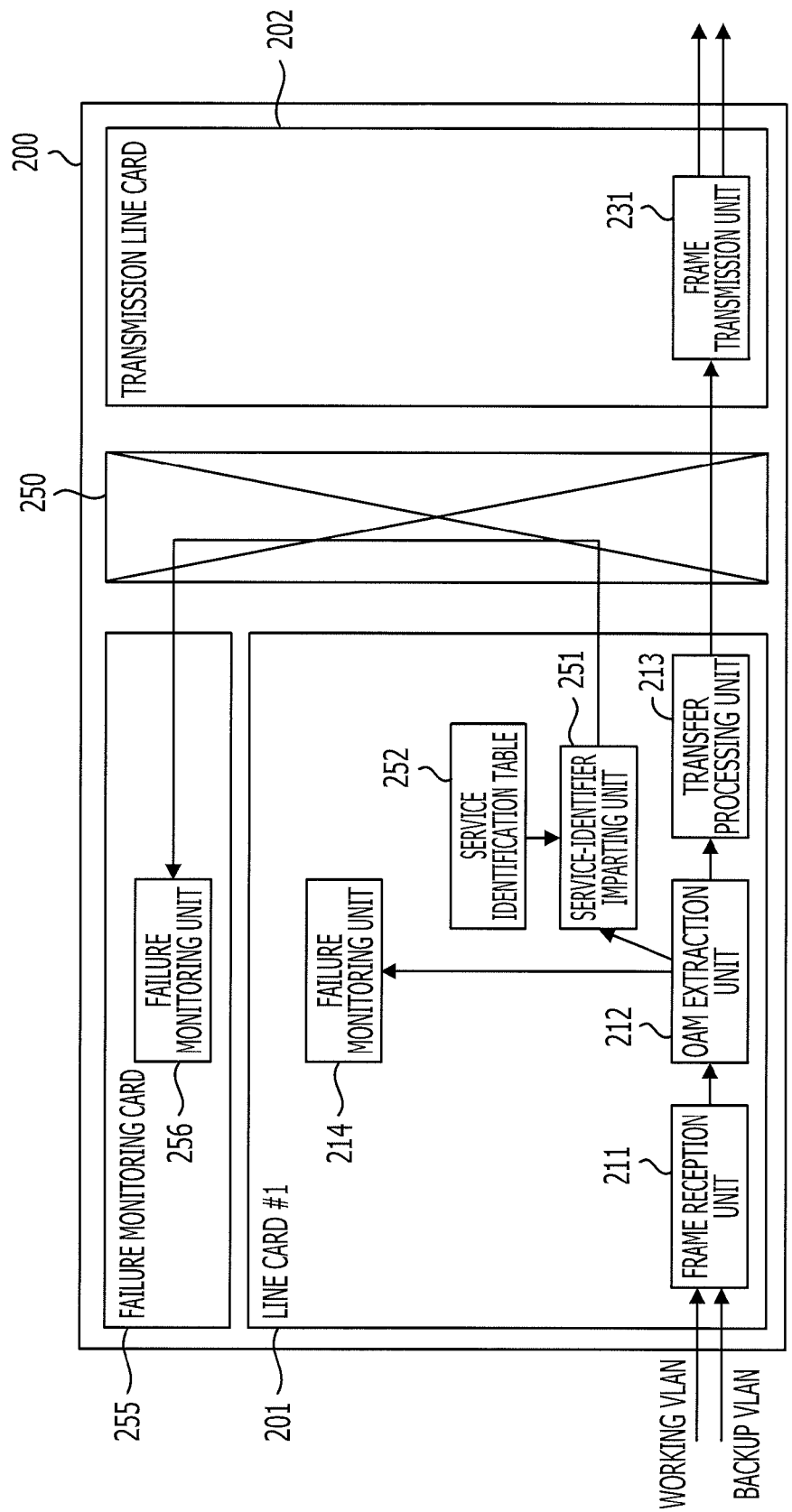
FIG. 35 is a diagram illustrating an exemplary configuration of a receiving system of a communication apparatus.
Figure 36:
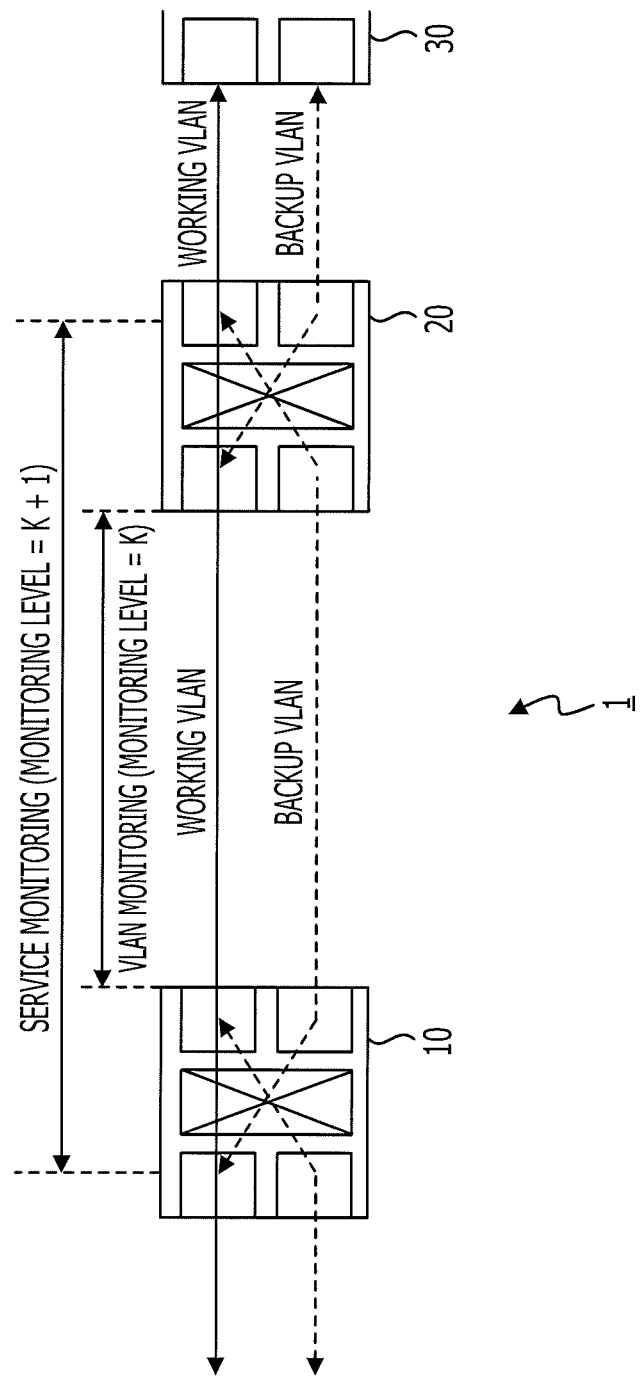
FIG. 36 is a diagram illustrating an exemplary configuration of a communication apparatus.
Figure 38:
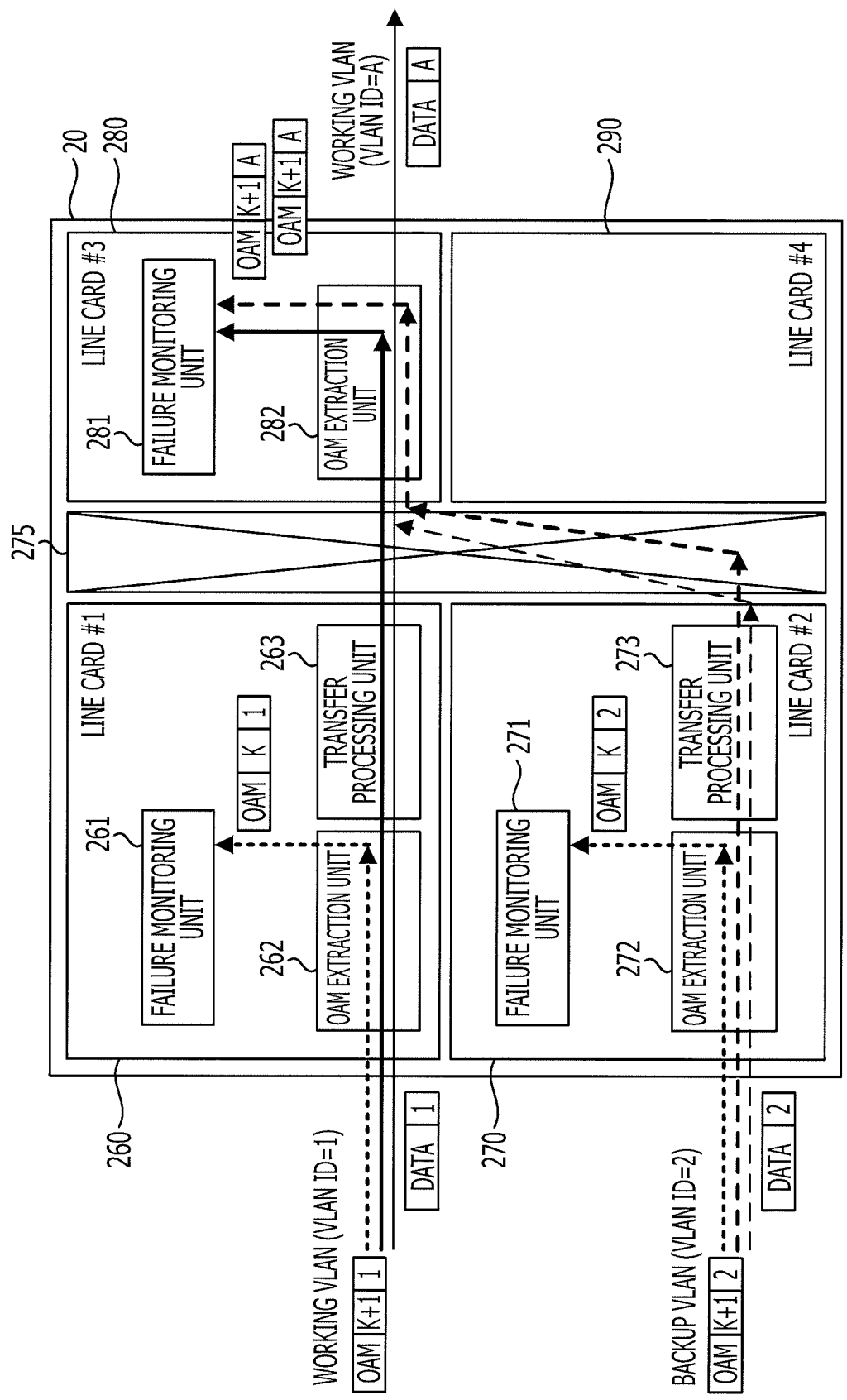
FIG. 38 is a diagram illustrating an exemplary operation of a communication apparatus.
Figure 39:
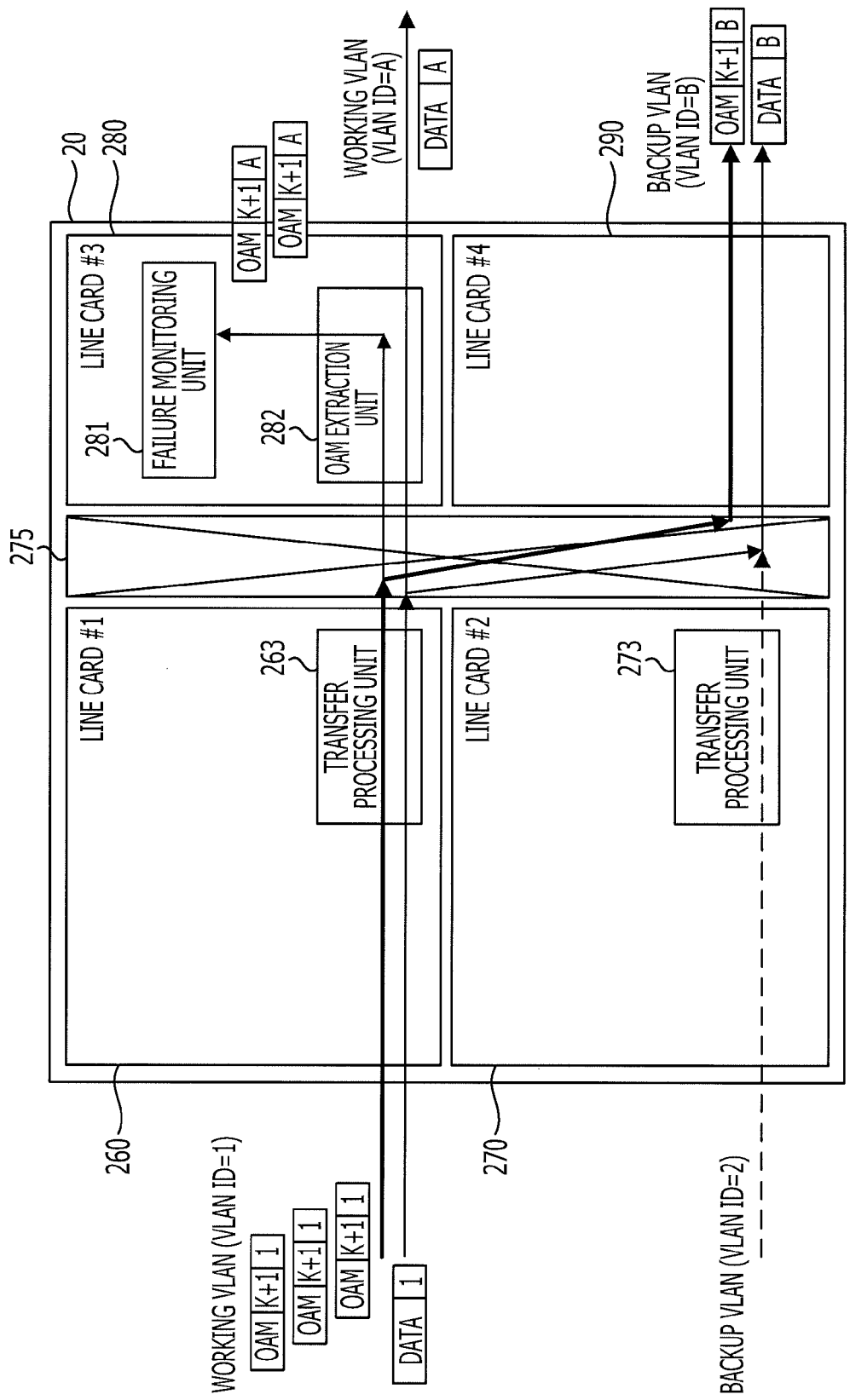
FIG. 39 is a diagram illustrating an exemplary operation of a communication apparatus.

The failure monitors 214 and 224 for service monitoring each include a failure monitor card 255 for exclusive use as in the case of the second modified embodiment (for example, as illustrated in FIG. 13) in the second embodiment. The failure monitors for service monitoring may also monitor a service by the failure monitor 256 of failure monitor card 255. FIG. 35 is a diagram illustrating an exemplary configuration of the communication apparatus 200 in this case. In this case, the service identification table 252 may store the card number (or board number) of the failure monitor card 255 as a transmission destination.

<Fifth Embodiment>

Figure 26:
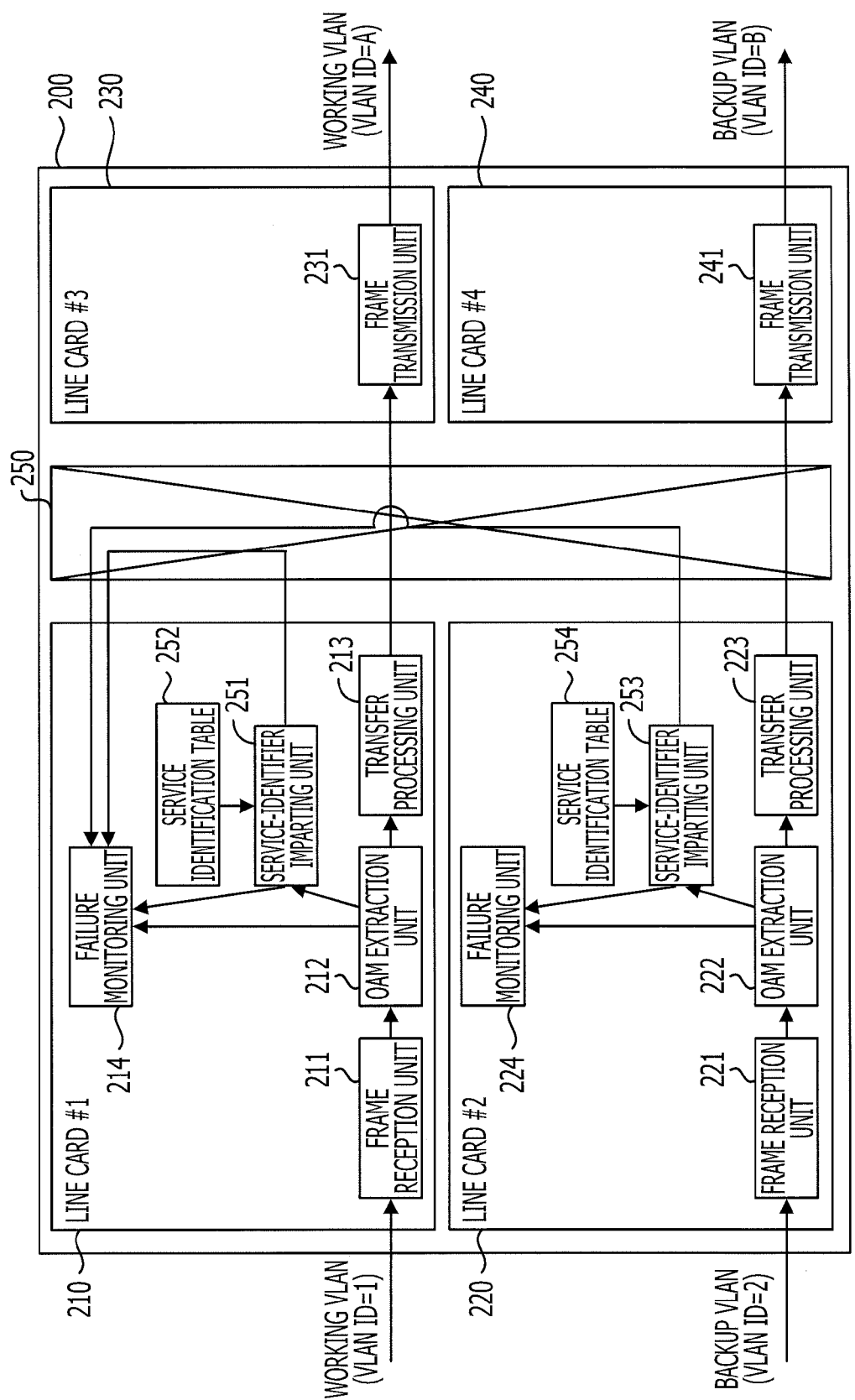
FIG. 26 is a diagram illustrating an exemplary configuration of a receiving system of a communication apparatus.
Figure 27:
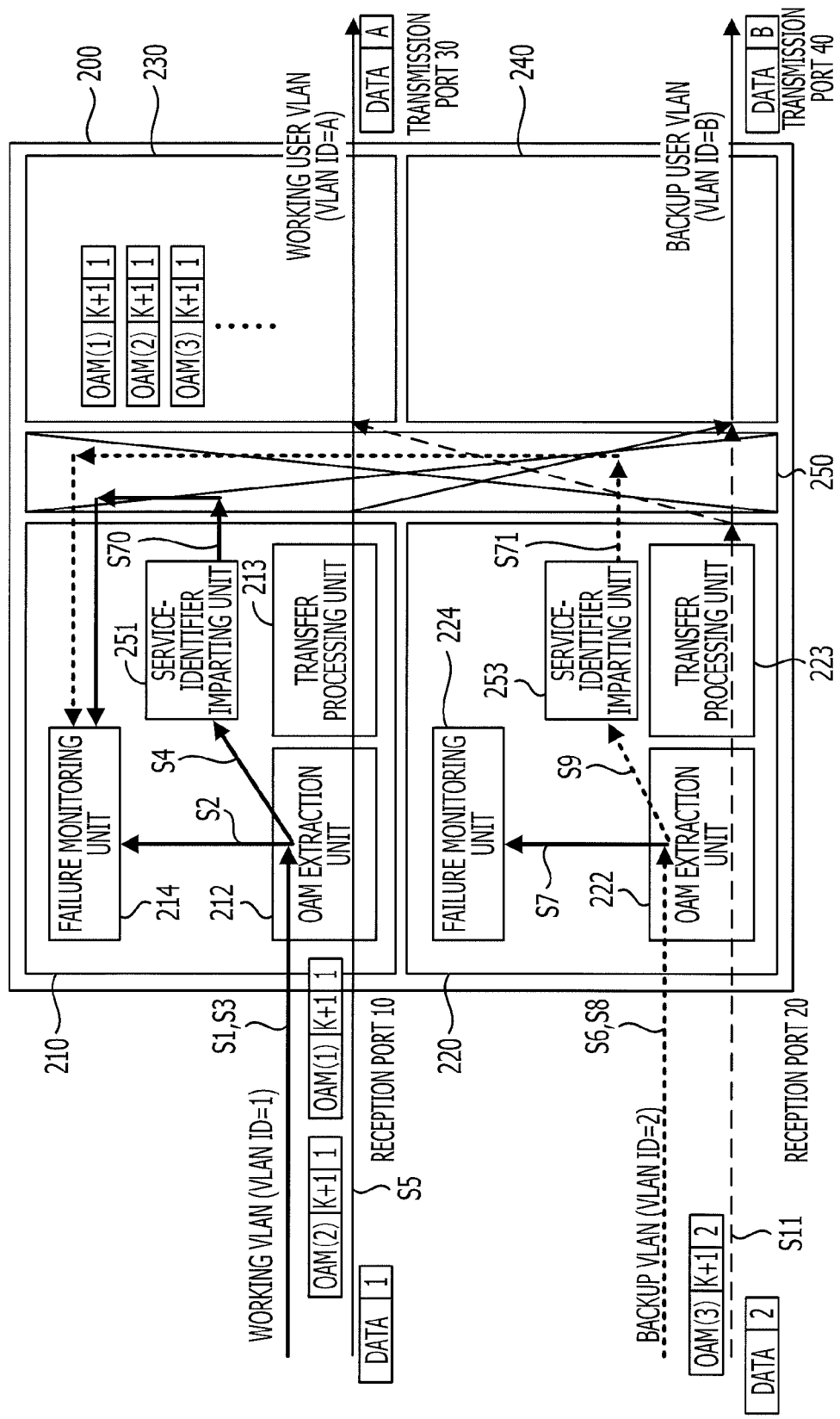
FIG. 27 is a diagram illustrating an exemplary operation of a communication apparatus.

Next, a fifth embodiment will be described. The fifth embodiment includes two line cards #1 (201) and two line cards # 3 (202) of the fourth embodiment. FIG. 26 is a diagram illustrating an exemplary configuration of the receiving system of the communication apparatus 200 according to the fifth embodiment. FIG. 27 and FIG. 28 are diagrams illustrating exemplary operations. Furthermore, the exemplary configurations and exemplary operations of the transmission system of the communication apparatus 200 in the fifth embodiment are represented in, for example, FIG. 5, FIG. 8, and FIG. 9 in a manner similar to the second embodiment.

<Exemplary Configuration>

FIG. 26 is a diagram illustrating an exemplary configuration of the transmission system of the communication apparatus 200 according to the third embodiment. For example, the line card #1 (201) of FIG. 24 corresponds to both a line card #1 (210) and a line card #2 (220). The line card #3 (202) in FIG. 4 corresponds to a line card #3 (230) and a line card #4 (240) in FIG. 26. In addition, the line card #1 (210) includes a service-identifier provider 251 and a service identification table 252, while the line card #2 (220) includes a service-identifier provider 253 and a service identification table 254.

The service-identifier provider 251 of the line card #1 (210) accepts a service-monitoring OAM frame (for example, one with VLAN ID=1), which is received through the working VLAN, and provides the service-monitoring OAM frame with a service identifier. In addition, the service-identifier provider 251 transfers the service-monitoring OAM frame with the service identifier to the failure-monitor 214 for monitoring services according to the service identification table 252.

The service-identifier provider 253 of the line card #2 (220) accepts a service-monitoring OAM frame (for example, one with VLAN ID=2), which is received through the backup VLAN. The service-identifier provider 253 provides the service-monitoring OAM frame with a service identifier according to the service identification table 254 (for example, as illustrated in FIG. 25C). Then, the service-identifier provider 253 transfers the service-monitoring OAM frame to the failure-monitor 214 for monitoring services through the switch module 250.

The failure monitor 214 accepts the service-monitoring OAM frames provided with the same or common service identifier and monitors services using a timer or the like.

<Exemplary Operation>

Next, an exemplary operation of the communication apparatus 200 according to the fifth embodiment will be described. FIG. 27 and FIG. 28 are diagrams illustrating exemplary operations.

The communication apparatus 200 receives a service-monitoring OAM frame (for example, one with VLAN ID=1) from the working VLAN when the working VLAN connected to the communication apparatus 100 is in a steady state. The service-identifier provider 251 accepts the received service-monitoring OAM frame and provides this OAM frame with a service identifier (for example, "100"), and then transmits the OAM frame to the failure-monitor 214 for monitoring services through the switch module 250 (S70).

At this time, for example, even if the transfer processor 213 changes the path between the communication apparatus 200 and the communication apparatus 300 from the working VLAN to the backup VLAN, the failure monitor 214 accepts the service-monitoring OAM frame without the influence of the path change.

On the other hand, when a failure or the like occurs in the working VLAN connected to the communication apparatus 100 and the path is changed from the working VLAN to the backup VLAN, the line card #2 (220) receives a service-monitoring OAM frame (for example, one with VLAN ID=2). The service-identifier provider 253 provides the frame with a service identifier (for example, "100") and transfers the frame to the failure-monitor 214 for monitoring services through the switch module 250 (S71).

At this time, for example, even if the transfer processor 223 changes the path between the communication apparatus 200 and the communication apparatus 300 from the working VLAN to the backup VLAN, the failure monitor 214 may accept the service-monitoring OAM frame from the service-identifier provider 253 without the influence of the path change.

The failure monitor 214 accepts the service-monitoring OAM frame (S70, S71) and confirms the continuity of the frame with a sequence number, a timer, or the like to monitor a service failure.

In the aforementioned embodiments, the service-identifier provider 251 transmits a service-monitoring OAM frame to the failure monitor 214 through the switch module 250. For example, as illustrated in FIG. 28, the service-identifier provider 251 is also capable of directly outputting the OAM frame to the failure monitor 214 (S70-1).

Thus, the fifth embodiment is also configured such that a service-monitoring OAM frame received from the working VLAN and a service-monitoring OAM frame received from the backup VLAN are provided with the same service identifier in spite of having different VLAN IDs, and are input to the failure monitor 214. The failure monitor 214 may process the two OAM frames with no distinction even if the path between the communication apparatus 200 and the communication apparatus 300 is changed. Thus, the failure monitor 214 confirms the continuity of the OAM frame to monitor a service failure between the communication apparatus 200 and the communication apparatus 100 without cooperating with other failure monitors or the like.

In addition, even if the transfer processor 213 changes the path between the communication apparatus 200 and the communication apparatus 300 from the working VLAN to the backup VLAN, a service-monitoring OAM frame is not influenced by the path change as the service-monitoring OAM frame is input into the failure monitor 214 through the service-identifier provider 251 or the like. Therefore, erroneously detecting a service failure may be prevented in the communication apparatus 200 by changing the path.

Although the description has been made in the second embodiment, the detection of a service failure may be also detected by the failure monitor card 255 for exclusive use and the failure monitor 256 (for example, as illustrated in FIG. 13 and FIG. 15). In this case, for example, the detection of a service failure may be performed using service-identifier providers 251 and 253 instead of the VLAN ID converter 225, and the service identification tables 252 and 254 instead of the VLAN ID conversion table 226.

Even when using the failure monitor card 255 for exclusive use or even when detecting a service failure by a failure monitor 214, for example, the destination of the service-monitoring OAM frame may be decided beforehand, allowing the failure-monitoring card number of the service identification table 252 to be deleted and the amount of information to be reduced.

<Sixth Embodiment>

Next, a sixth embodiment will be described. The sixth embodiment will be described as one using, for example, a service identifier as in the case of the fourth embodiment and so on and a plurality of failure monitors for monitoring service failures as in the case of the third embodiment.

Figure 32:
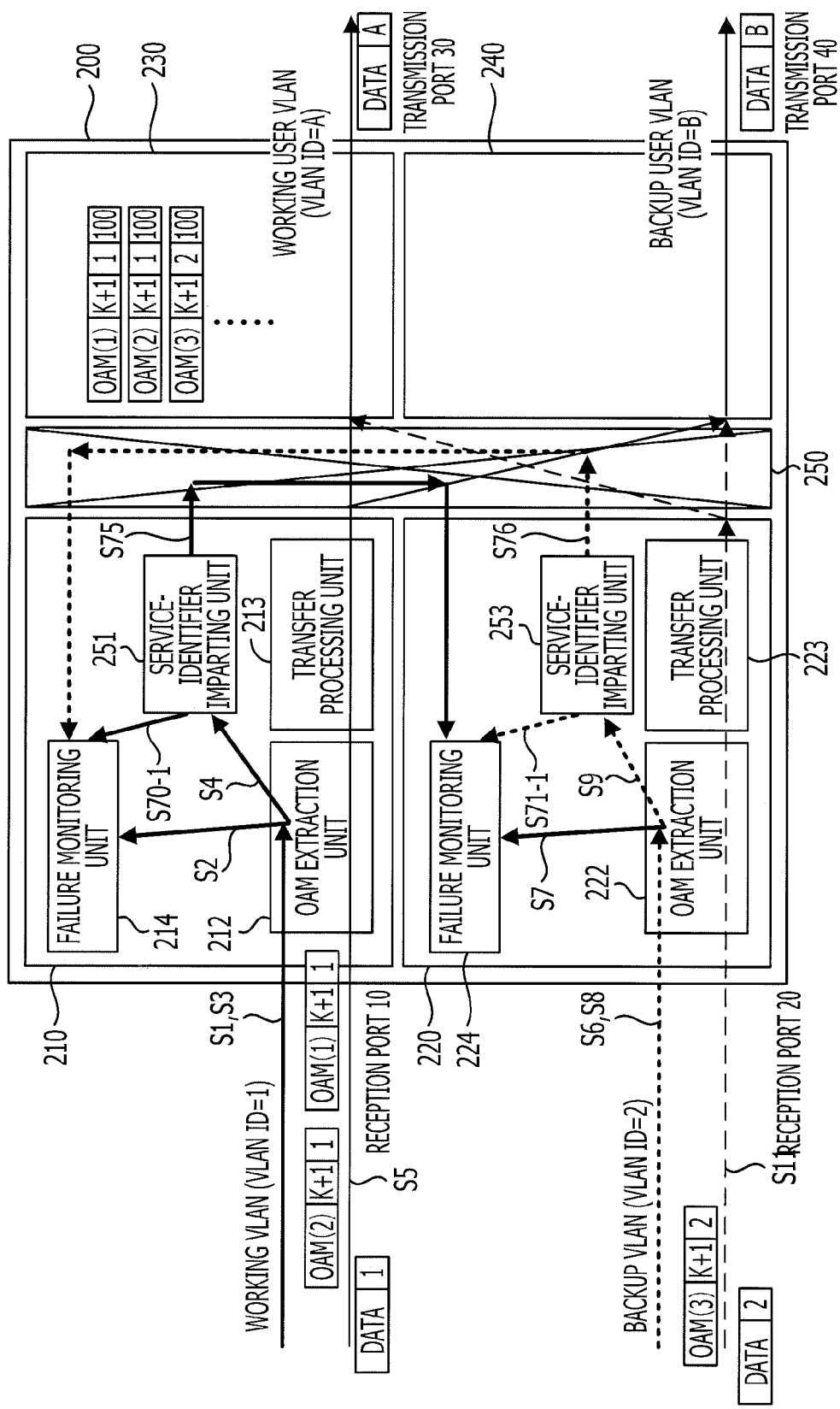
FIG. 32 is a diagram illustrating an exemplary operation of a communication apparatus.

FIG. 29 is a diagram illustrating an exemplary configuration of the receiving system of the communication apparatus 200 according to the sixth embodiment. FIG. 30A and FIG. 30B are diagrams illustrating exemplary service identification tables, and FIG. 31 and FIG. 32 are diagrams illustrating exemplary operations of the communication apparatus 200. Here, an exemplary configuration of the transmission system of the communication apparatus 200 is the same as that of the third embodiment (for example, as illustrated in FIG. 19).

<Exemplary Configuration>

An exemplary configuration of the receiving system of the communication apparatus 200 according to the sixth embodiment will be described. As illustrated in FIG. 29, the service-identifier provider 251 of the line card #1 (210) provides the service-monitoring OAM frame received from the working VLAN with a service identifier according to the service identification table 252. Then, the service-identifier provider 251 reproduces the OAM frame with the service identifier. The service-identifier provider 251 transfers the reproduced OAM frame to the two failure monitors 214 and 224 through the switch module 250 according to the service identification table 252.

The service identification table 252 retains information about all the card numbers (or board numbers) where the failure monitors 214 and 223 are present as transfer destinations as well as a target VLAN ID and a service identifier as in the case of the fifth embodiment. FIG. 30A is a diagram illustrating an exemplary service identification table 252. In this example, a service-monitoring OAM frame with a VLAN ID of "1", which is provided with a service identifier "100", is transferred to each of the card numbers "1000" and "2000".

On the other hand, the service-identifier provider 253 provides the service-monitoring OAM frame received from the backup VLAN with a service identifier according to the service identification table 254. Then, the service-identifier provider 253 reproduces the OAM frame with the service identifier. The service-identifier provider 253 transfers the reproduced OAM frame to the failure monitor 224 of the line card #2 (220) and the failure monitor 214 of the line card #1 (210) through the switch module 250 according to the service identification table 254.

FIG. 30B is a diagram illustrating an exemplary service identification table 254. In this example, a service-monitoring OAM frame with a VLAN ID of "2", which is provided with a service identifier "100", is transferred to each of the card numbers "1000" and "2000".

The two failure monitors 214 and 224 accept the service-monitoring OAM frames provided with the same service identifier and monitors services between the communication apparatus 200 and the communication apparatus 100 using a timer or the like.

<Exemplary Operation>

FIG. 31 is a diagram illustrating an exemplary operation of the communication apparatus 200 according to the sixth embodiment. When the working VLAN connected to the communication apparatus 100 is in a steady state, the service-identifier provider 251 accepts a service-monitoring OAM frame (for example, one with VLAN ID=1) and provides the frame with a service identifier (for example, "100"). The service-identifier provider 251 transfers the service-monitoring OAM frame with the service identifier to the two failure monitors 214 and 224 through the switch module 250 (S70, S75).

At this time, for example, when a failure occurs in the working VLAN between the communication apparatus 200 and the communication apparatus 300, the transfer processor 213 changes the path from the working VLAN to the backup VLAN and transmits a data frame or the like to the communication apparatus 300. However, the service-monitoring OAM frame is output to the two failure monitors 214 and 224 without being influenced by this path switching.

On the other hand, when a failure occurs in the working VLAN connected to the communication apparatus 100, the path is changed from the working VLAN to the backup VLAN. The service-identifier provider 253 accepts the service-monitoring OAM frame (for example, VLAN ID=2), which is input through the backup VLAN. The service-identifier provider 253 provides the input service-monitoring OAM frame with a service identifier (for example, "100"), and then reproduces the service-monitoring OAM frame. Then, the service-identifier provider 253 transfers the reproduced OAM frame to the two failure monitors 214 and 224 through the switch module 250 (S71, S76).

Even if the path between the communication apparatus 200 and the communication apparatus 300 is changed from the working VLAN to the backup VLAN at this time, the OAM frame is output to each of the failure monitors 214 and 224 without being influenced by the change.

The failure monitor 214 inputs a service-monitoring OAM frame from the service-identifier provider 251, when a working VLAN is in a steady state, and inputs a service-monitoring OAM frame from the service-identifier provider 253 when a path is changed to a backup VLAN, the failure monitor 214 accepts the service-monitoring OAM frame to which the same service identifier was given, even if a path is changed, and a service failure is monitored by checking the continuity of the OAM frame concerned, etc.

On the other hand, the failure monitor 224 accepts a service-monitoring OAM frame from the service-identifier provider 251 when the working VLAN is in a steady state. The failure monitor 224 accepts a service-monitoring OAM frame from the service-identifier provider 253 when the path is changed to the backup VLAN. The failure monitor 224 accepts the service-monitoring OAM frame provided with the service identifier even if the path is changed and monitors service failures by confirming the continuity or the like of the OAM frame.

Like the third embodiment, for example, the failure monitoring is performed such that a service failure is detected when all the failure monitors 214 and 224 including those which are not able to monitor services detect the generation of a failure. Even if the failure monitors 214 and 224 are not able to perform the service monitoring, there is no service failure when the failure monitors 224 and 214 on the other card detect that the service has not failed but is normal. For example, the detection of a service failure as described above may be realized by, for example, allowing the failure monitors 214 and 224 to notify an upper apparatus, which is connected to each of the failure monitors 214 and 224, of the presence or absence of a service failure.

Like the third embodiment, furthermore, when the service-monitoring OAM frame is output to each of the failure monitors 214 and 224 in the same line card #1 (210) or #2 (220), the service-monitoring OAM frame may be directly output to the failure monitors 214 and 224 without passing through the switch module 250.

An exemplary operation in this case will be described with reference to FIG. 32. The service-identifier provider 251 of the line card #1 (210) outputs one of the reproduced service-monitoring OAM frames (S70-1). Another OAM frame is output to the failure monitor 224 through the switch module 250 (S75). On the other hand, the service-identifier provider 253 also directly outputs one of the reproduced OAM frames to the failure monitor 214 through the switch module 250 (S76) and directly outputs the other thereof to the failure monitor 224 (S71-1).

Thus, the sixth embodiment is also configured such that a service-monitoring OAM frame received from the working VLAN and a service-monitoring OAM frame received from the backup VLAN are provided with the same service identifier in spite of having different VLAN IDs and are input to the failure monitor 214. The failure monitor 214 may process the two OAM frames without distinguishing between them even if the path between the communication apparatus 200 and the communication apparatus 300 is not changed. Thus, the failure monitor 214 and may monitor a service failure between the communication apparatus 200 and the communication apparatus 100 without cooperating with another failure unit and the like.

Even if the path between the communication apparatus 200 and the communication apparatus 300 is changed from the working VLAN to the backup VLAN, a service-monitoring OAM frame is not influenced by the path change since the service-monitoring OAM frame is input into the failure monitor 214 through the service-identifier provider 251 or the like. Therefore, the communication apparatus 200 is able to prevent erroneous detection of the service monitoring between the communication apparatus 200 and the communication apparatus 100 by the change of the path.

Furthermore, each of the failure monitors 214 and 224 of two line cards #1 (210) and #2 (220) monitors a service failure between the communication apparatus 200 and the communication apparatus 100. Thus, the service failure may be monitored in a distributed manner. Therefore, even when one of the line card #1 (210) and the line card #2 (220) paths has a failure, the failure monitor 214 or 224 of the other of the line card #1 (210) or the line card #2 (220) may monitor a service failure.

<Other Embodiments>

The second embodiment has been described such that the failure monitor 214 of the line card #1 (210), which is connected to the working VLAN, serves as a failure monitor for monitoring services (for example, as illustrated in FIG. 4). For example, the failure monitor 224 of the line card #2 (220) connected to the backup VLAN may be a failure-monitor for monitoring services. In this case, the line card #1 (210) includes a VLAN ID converter 225 and a VLAN ID conversion table 226.

According to the VLAN ID conversion table 226, the VLAN ID converter 225 converts the VLAN ID of a service-monitoring OAM frame into the same as that of the backup VLAN (for example, VLAN ID=2), and then outputs the service-monitoring OAM frame to the failure monitor 224. There, service-monitoring OAM frames received from the working VLAN and the backup VLAN are brought together in the failure monitor 224. Therefore, the failure monitor 224 may monitor a service failure without cooperating with another monitor or the like. Therefore, the failure monitor 224 is able to avoid an erroneous detection of a service failure without being influenced by the change of the path between the communication apparatus 200 and the communication apparatus 300.

In the fifth embodiment, the failure monitor 214 of the line card #1 (210) has been described as a failure-monitor for monitoring services (for example, as illustrated in FIG. 26). Alternatively, for example, the failure monitor 224 of the line card #2 (220) may be a failure-monitor for monitoring services. In this case, the line card #2 (220) is stored as a destination in the service identification table 252 of the line card #1 (210), while the service-identifier provider 251 outputs the service-monitoring OAM frame provided with the service identifier to the failure monitor 224.

The service-monitoring OAM frames, which are received from the working VLAN and the backup VLAN, are brought together in the failure monitor 224 and set to the same VLAN ID. Thus, a service between the communication apparatus 200 and the communication apparatus 100 may be monitored. Therefore, the failure monitor 224 is allowed to monitor a service without cooperating with another monitor. In addition, the failure monitor 224 is able to avoid an erroneous detection with respect to a service failure without being influenced by the change of the path between the communication apparatus 200 and the communication apparatus 300.

In the first to sixth embodiments, examples in which the communication apparatus 200 and the communication 100 are connected to each other through two paths, the working VLAN and the backup VLAN, have been described. Alternatively, for example, two or more working VLANs and two or more backup VLANs may be installed. In this case, the communication apparatus may be connected to two or more working VLANs using the line card #1 (210) and two or more backup VLANs using the line card #2 (220).

Alternatively, the communication apparatus 200 may further include three or more line cards and the line cards may be connected to the respective working VLAN and the respective backup VLAN. In each of these cases, one of the failure monitors is employed for monitoring services and provided with the VLAN ID converter 225 and the VLAN ID conversion table 226 on an additional line card other than the line cards having the failure monitors. Then, in a manner similar to the first embodiment or the like, the VLAN ID converter 224 makes the VLAN ID of the input service-monitoring OAM frame the same or common VLAN ID and transfers the VLAN ID to the service-monitoring OAM frames.

In the first to sixth embodiments, examples in which the working VLAN and the backup VLAN are switched in the path between the communication apparatus 200 and the communication 100 and the path between the path between the communication apparatus 200 and the communication 300 have been described. Similarly, for example, the first to the sixth embodiments may be also implemented by changing each path from the backup VLAN to the working VLAN.

In the first to sixth embodiments, the communication apparatus 200 includes, for example, a network interface, a processor, a memory, a logic circuit, and so on. The network interface is a device for communicating to other apparatus. Examples of the network interface include Ethernet interface and a wireless LAN interface. The processor is a device for processing data. Examples of the processor include a central processing unit (CPU) and a digital signal processor (DSP). The memory is a device for storing data. Examples of the memory include a read only memory (ROM) and a random access memory (RAM). The logic circuit is an electronic circuit which performs a logical operation. Examples of the logic circuit include a large scale integration (LSI) circuit and a field-programming gate array (FPGA). In the first to sixth embodiments, the hardware realizes the respective functions of the communication apparatus 200.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A communication apparatus connected to an adjacent communication apparatus through a first path and a second path to receive a frame with a path identifier through the first path or the second path, the apparatus comprising:
   a first network interface configured for communicating via the first path;
   a second network interface configured for communicating via the second path; and
   a processor configured for
   extracting a first monitoring frame and a second monitoring frame, which are failure monitoring frames, from frames received on the first network interface and the second network interface;
   detecting a failure, based on the first and the second monitoring frames; and
   converting a path identifier of the first monitoring frame or a path identifier of the second monitoring frame, which are extracted, to make the path identifier of the first monitoring frame equal to the path identifier of the second monitoring frame.

2. The communication apparatus according to claim 1, wherein
   the extracting includes a first monitoring-frame extracting for extracting the first monitoring frame and a second monitoring-frame extracting for extracting the second monitoring frame,
   the converting includes a first converting for converting a first inserted path identifier inserted in the first monitoring frame into a third path identifier, and a second converting for converting a second inserted path identifier inserted in the second monitoring frame into the third path identifier, and
   the detecting detects the failure based on the first monitoring frame and the second monitoring frame outputted from the converting.

3. The communication apparatus according to claim 1, wherein
   the extracting includes a first monitoring-frame extracting for extracting the first monitoring frame and a second monitoring-frame extracting for extracting the second monitoring frame,
   the converting converts a second included path identifier included in the second monitoring frame into a first included path identifier included in the first monitoring frame, and
   the detecting detects the failure based on the first monitoring frame and the second monitoring frame outputted from the converting.

4. The communication apparatus according to claim 2, wherein
   the first monitoring-frame extracting, the first converting, and the detecting are mounted on a board connected to the first path.

5. The communication apparatus according to claim 3, wherein
   the first extracting and the detecting are mounted on a board connected to the first path.

6. The communication apparatus according to claim 2, wherein
   the detecting includes a first detecting and a second detecting,
   the first converting outputs the first monitoring frame in which the third path identifier is inserted, to the first detecting and the second detecting,
   the second converting outputs the second monitoring frame in which the third path identifier is inserted, to the first detecting and the second detecting, and
   the first and second detecting detect failures on the first and second paths based on the first and second monitoring frames in which the third path identifier is inserted, respectively.

7. The communication apparatus according to claim 3, wherein
   the detecting includes a first detecting and a second detecting, the first monitoring-frame extracting outputs the first monitoring frame to the first detecting and the second detecting,
   the converting outputs the second monitoring frame in which the first included path identifier is inserted, to the first detecting and the second detecting, and
   the first and second detecting detect failures on the first and second paths based on the first and second monitoring frames in which the first included path identifier is inserted, respectively.

8. The communication apparatus according to claim 6, wherein
   the first monitoring-frame extracting, the first converting, and the first detecting are mounted on a board connected to the first path.

9. The communication apparatus according to claim 7, wherein
   the first monitoring-frame extracting and the first detecting are mounted on a board connected to the first path.

10. The communication apparatus according to claim 1, wherein the detecting is mounted on a board different from the board on which the extracting and the converting are mounted.

11. The communication apparatus according to claim 1, wherein the detecting generates a third monitoring frame and a fourth monitoring frame, and the third monitoring frame and the fourth monitoring frame are transmitted to the first path and the second path, respectively.

12. The communication apparatus according to claim 1, wherein the processor is configured for a first transmission switching and a second transmission switching;

the detecting includes a first detecting and a second detecting, the first detecting generates a third monitoring frame and a fourth monitoring frame, and transmits the third and fourth monitoring frames to the first and second transmission switching, respectively, the second detecting generates the third monitoring frame and the fourth monitoring frame, and transmits the third and fourth monitoring frames to the first and second transmission switching, respectively, the first transmission switching accepts the third monitoring frame outputted from the first detecting and the third monitoring frame outputted from the second detecting, and transmits one of the third monitoring frames to the first path, and the second transmission switching accepts the third monitoring frame outputted from the first detecting and the fourth monitoring frame outputted from the second detecting, and transmits one of the third monitoring frame and the fourth monitoring frame to the second path.

13. A communication apparatus connected to an adjacent apparatus through a first path and a second path to receive a frame with a path identifier through the first path or the second path, the apparatus comprising:

a first network interface configured for communicating via the first path;

a second network interface configured for communicating via the second path; and a processor configured for extracting a first monitoring frame and a second monitoring frame, which are failure monitoring frames, from frames received from the first path and the second path;

detecting a failure, based on the first and the second monitoring frames; and imparting a service identifier to each of the first monitoring frame and the second monitoring frame, which are extracted by the exacting, and inputting the first monitoring frame and the second monitoring frame to the detecting.

14. The communication apparatus according to claim 13, wherein the extracting includes a first monitoring-frame extracting for extracting the first monitoring frame received from the first path, and a second monitoring-frame extracting for extracting the second monitoring frame received from the second path, the imparting includes a first service-identifier imparting for imparting the first monitoring frame with the service identifier and a second service-identifier imparting for imparting the second monitoring frame with the service identifier, and the detecting detects the failure based on the first monitoring frame outputted from the first service-identifier imparting and the second monitoring frame outputted from the second service-identifier imparting.

15. The communication apparatus according to claim 14, wherein the first monitoring-frame extracting, the first service-identifier imparting, and the detecting are mounted on a board connected to the first path.

16. The communication apparatus according to claim 14, wherein the detecting includes a first failure detecting and a second failure detecting, the first service-identifier imparting outputs the first monitoring frame imparted with the service identifier to the first and second failure detecting, the second service-identifier imparting outputs the second monitoring frame imparted with the service identifier to the first and second failure detecting, and the first and second failure detecting detect failures on the first and second paths based on the first and second monitoring frames in which the service identifiers are inserted, respectively.

17. The communication apparatus according to claim 13, wherein the detecting is mounted on a board different from the board on which the extracting and the imparting are mounted.

\* \* \* \* \*